(12) United States Patent
Chen et al.

(10) Patent No.: US 10,595,031 B2
(45) Date of Patent: Mar. 17, 2020

(54) SELECTION OF TARGET OUTPUT LAYERS IN HIGH EFFICIENCY VIDEO CODING EXTENSIONS

(71) Applicant: QUALCOMM Incorporated, San Diego, CA (US)

(72) Inventors: Ying Chen, San Diego, CA (US); Adarsh Krishnan Ramasubramonian, San Diego, CA (US); Ye-Kui Wang, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 1364 days.

(21) Appl. No.: 14/328,406

(22) Filed: Jul. 10, 2014

(65) Prior Publication Data

US 2015/0016532 A1      Jan. 15, 2015

Related U.S. Application Data

(60) Provisional application No. 61/845,837, filed on Jul. 12, 2013.

(51) Int. Cl.
| | |
|---|---|
| *H04N 19/46* | (2014.01) |
| *H04N 19/30* | (2014.01) |
| *H04N 19/44* | (2014.01) |
| *H04N 19/597* | (2014.01) |

(52) U.S. Cl.
CPC ............ *H04N 19/46* (2014.11); *H04N 19/30* (2014.11); *H04N 19/44* (2014.11); *H04N 19/597* (2014.11)

(58) Field of Classification Search
CPC ...................................................... H04N 19/70
See application file for complete search history.

(56) References Cited

U.S. PATENT DOCUMENTS 9,826,243 B2    11/2017   Luo et al.

FOREIGN PATENT DOCUMENTS

| | | |
|---|---|---|
| CN | 101658038 A1 | 2/2010 |
| WO | 2012018951 A1 | 2/2012 |
| WO | 2012018953 A1 | 2/2012 |
| WO | 2014002914 A1 | 1/2014 |
| WO | 2014167833 A1 | 10/2014 |
| WO | 2015004924 A1 | 1/2015 |
| WO | 2015057787 A1 | 4/2015 |

OTHER PUBLICATIONS

Wang, et al., "Comments to MVC JD 7.0," JVT Meeting; MPEG Meeting; Jul. 20-25, 2008; Hannover, DE; (Joint Video Team of ISO/IEC JTC1/SC29/WG11 and ITU-T SG.16), No. JVT-AB024, XP030007410, ISSN: 0000-0090, 4 pp.

(Continued)

*Primary Examiner* — Y Lee
(74) *Attorney, Agent, or Firm* — Shumaker & Sieffert, P.A.

(57) ABSTRACT

A method, apparatus, and manufacture for processing video data. A list of output layer sets in a video bitstream is received, and an index to at least one target output layer set in the list of output layer sets is received. Next, target output layers in the at least one target output layer set is determined based on the index. At least the target output layers from the video bitstream are decoded. Then, the decoded target output layers are output without outputting layers that are not targeted for output.

24 Claims, 9 Drawing Sheets

(56) References Cited

OTHER PUBLICATIONS

Response to Written Opinion dated Jan. 26, 2015, from International Application No. PCT/US2014/046319, filed on May 7, 2015, 4 pp.
Second Written Opinion from International Application No. PCT/US2014/046319, dated Jun. 22, 2015, 7 pp.
Response to Second Written Opinion dated Jun. 22, 2015, from International Application No. PCT/US2014/046319, filed on Aug. 21, 2015, 4 pp.
International Preliminary Report on Patentability from International Application No. PCT/US2014/046319, dated Oct. 6, 2015, 8 pp.
Wiegand et al., "WD1: Working Draft 1 of High-Efficiency Video Coding," JCTVC-C403, 3rd Meeting: Guangzhou, CN, Oct. 7-15, 2010, 137 pp.
Wiegand et al., "WD2: Working Draft 2 of High-Efficiency Video Coding," JCTVC-D503, 4th Meeting: Daegu, KR, Jan. 20-28, 2011, 153 pp.
Wiegand et al., "WD3: Working Draft 3 of High-Efficiency Video Coding," Document JCTVC-E603, 5th Meeting: Geneva, CH, Mar. 16-23, 2011, 193 pp.
Bross et al., "WD4: Working Draft 4 of High-Efficiency Video Coding," 6th Meeting: JCTVC-F803_d2, Torino, IT, Jul. 14-22, 2011, 226 pp.
Bross et al., "WD5: Working Draft 5 of High-Efficiency Video Coding," 7th Meeting: Geneva, Switzerland, Nov. 21-30, 2011, JCTVC-G1103_d2, 214 pp.
Bross et al., "High efficiency video coding (HEVC) text specification draft 6," 8th Meeting: San Jose, CA, USA, Feb. 1-10, 2012, JCTVC-H1003, 259 pp.
Bross et al., "High efficiency video coding (HEVC) text specification draft 7," 9th Meeting: Geneva, CH, Apr. 27,-May 7, 2012, JCTVC-I1003_d2, 290 pp.
Bross et al., "High efficiency video coding (HEVC) text specification draft 8," 10th Meeting: Stockholm, SE, Jul. 11-20, 2012, JCTVC-J1003_d7, 261 pp.
Bross et al., "High efficiency video coding (HEVC) text specification draft 9," 11th Meeting: Shanghai, CN, Oct. 10-19, 2012, JCTVC-K1003_v7, 290 pp.
Bross et al., "High efficiency video coding (HEVC) text specification draft 10 (for FDIS & Last Call)," 12th Meeting: Geneva, CH, Jan. 14-23, 2013, JCTVC-L1003_v34, 310 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.
ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.
Hannuksela, "One pager on MVC File Format," MPEG Meeting; Jul. 26-30, 2010; Geneva, CH; (Motion Picture Expert Group or ISO/IEC JTC1/SC29/WG11), No. N11453, XP030017950, 2 pp.
Ramasubramonian et al., "MV-HEVC/SHVC HLS on DPB operations," JCT-3V Meeting; Jul. 27-Aug. 8, 2013; Vienna, AT; (The Joint Collaborative Team on 3D Video Coding Extension Development of ITU-T SG.16 WP 3 and ISO/IEC JTC1/SC29/WG11), No. JCT3V-E0061r2, XP002730730, 5 pp.
Singer et al., "ISO/IEC 14496-15/FDIS + Cor1Cor2 + Amd1," MPEG Meeting; Oct. 26-30, 2009; Xian, CN; (Motion Picture Expert Group or ISO/IEC JTC1/SC29/WG11), No. N10952, XP030017451, ISSN: 0000-0031, 98 pp.
Wang et al., "MV-HEVC/SHVC HLS: On VPS and SPS in HEVC 3DV and scalable extensions," JCT-3V Meeting; Apr. 20-26, 2013; Incheon, KR; (The Joint Collaborative Team on 3D Video Coding Extension Development of ITU-T SG.16 WP 3 and ISO/IEC JTC1/SC29/WG11); URL: http://phenix.int-evry.fr/jct2/, No. JCT3V-D0047, 22 pp.
International Search Report and Written Opnion for International Application No. PCT/US2014/046319 dated Oct. 21, 2014, 13 pp.
Taiwan Search Report—TW103124045—TIPO—dated Feb. 6, 2018.
Boyce J., et al., "High-Level Syntax Modifications for HEVC Extensions", Joint Collaborative Team on Video Coding (JCT-VC ) of ITU-T SG 16 WP 3 and ISO/IEC JTC 1/SC 29/WG 11, 13th Meeting: Incheon, KR, Apr. 8, 2013, JCTVC-M0045, pp. 1-6.
Chen Y., et al., "AHG7: Target Output Views for MV-HEVC", Joint Collaborative Team on 3D Video Coding Extension Development of ITU-TSG 16 WP 3 and ISO/IEC JTC 1/SC 29/WG 11, 3rd Meeting, Geneva, CH, Jan. 9, 2013, pp. 1-2, JCT3V-00059.
Hendry, et al., "AHG 9: Inter-layer Prediction Indication at Picture Level", Joint Collaborative Team on Video Coding (JCT-VC) of ITU-T SG 16 WP 3 and ISO/IEC JTC 1/SC29/WG 11, 13th Meeting, Incheon, KR, Apr. 17, 2013, JCTVC-M0129_r1, pp. 1-7.
Ramasubramonian A.K., et al., "MV-HEVC/SHVC HLS: On DPB Operations", Joint Collaborative Team on Video Coding (JCT-VC) of ITU-T SG 16 WP 3 and ISO/IEC JTC 1/SC 29/WG 11, 14th Meeting: Vienna, AT, Aug. 2013, pp. 1-6, JCTVC-N0093r2.
Ramasubramonian A.K., et al., "MV-HEVC/SHVC HLS: DPB-Related Parameters in SPS and VPS", 14. JCT-VC Meeting; Jul. 25, 2013-Aug. 2, 2013; Vienna; (Joint Collaborative Team on Video Coding of ISO/IEC JTC1/SC29/WG11 and ITU-T SG.16); URL: http://wftp3.itu.int/av-arch/jctvc-site/ No. JCTVC-N0091, Jul. 16, 2013 (Jul. 16, 2013), pp. 1-7, XP030114537.
Wang Y-K., et al., "MV-HEVC/SHVC HLS: On VPS and SPS in HEVC 3DV and Scalable Extensions", Joint Collaborative Team on 3D Video Coding Extensions of ITU-T SG 16 WP 3 and ISO/IEC JTC 1/SC 29/WG 11, 4th Meeting, Incheon, KR, Apr. 23, 2013, JCT3V-D0047_V2, pp. 1-25.

SELECTION OF TARGET OUTPUT LAYERS IN HIGH EFFICIENCY VIDEO CODING EXTENSIONS

This application claims the benefit of U.S. Provisional Application No. 61/845,837, filed Jul. 12, 2013, the entire contents of which are hereby incorporated by reference.

TECHNICAL FIELD

This disclosure generally relates to processing video data and, more particularly, processing operation points used in video data.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques for selection of an output operation point that is specified by a target output layer set and a temporal ID for multi-layer HEVC extensions. The techniques may provide improved efficiency of signaling information associated with the operation points and resolve problems with identifying the layers to be outputted during decoding.

In one example, a method of decoding video data includes receiving an index to at least one target output layer set in a list of output layer sets, determining target output layers in the at least one target output layer set based on the index, decoding at least the target output layers, and outputting the decoded target output layers without outputting layers that are not targeted for output.

In another example, a device for decoding video data includes a memory configured to store data; and one or more processors in communication with the memory and configured to: receive an index to at least one target output layer set in a list of output layer sets; determine target output layers in the at least one target output layer set based on the index; decode at least the target output layers; and output the decoded target output layers without outputting layers that are not targeted for output.

In another example, a non-transitory computer-readable storage medium having stored thereon instructions that, when executed, cause at least one processor to: receive an index to at least one target output layer set in a list of output layer sets; determine target output layers in the at least one target output layer set based on the index; decode at least the target output layers; and output the decoded target output layers without outputting layers that are not targeted for output.

In another example, a device for decoding video data, the device includes means for receiving an index to at least one target output layer set in a list of output layer sets; means for determining target output layers in the at least one target output layer set based on the index; means for decoding at least the target output layers; and means for outputting the decoded target output layers without outputting layers that are not targeted for output.

In another example, a method for processing video data includes determining a set of layers that are targeted for output; determining an index to a target output layer set in a list of output layer sets such that the target output layer set represents the determined set of layers that are targeted for output; and sending the index to a video decoder.

In another example, a device for decoding video data includes a memory configured to store data; and one or more processors in communication with the memory and configured to receive an index to at least one target output layer set in a list of output; determine a set of layers that are targeted for output; determine an index to a target output layer set in a list of output layer sets such that the target output layer set represents the determined set of layers that are targeted for output; and send the index to a video decoder.

In another example, a non-transitory computer-readable storage medium having stored thereon instructions that, when executed, cause at least one processor to: determine a set of layers that are targeted for output; determine an index to a target output layer set in a list of output layer sets such that the target output layer set represents the determined set of layers that are targeted for output; and send the index to a video decoder.

The details of one or more examples are set forth in the accompanying drawings and the description below. Other features, objects, and advantages will be apparent from the description and drawings, and from the claims.

DETAILED DESCRIPTION

Figure 1:
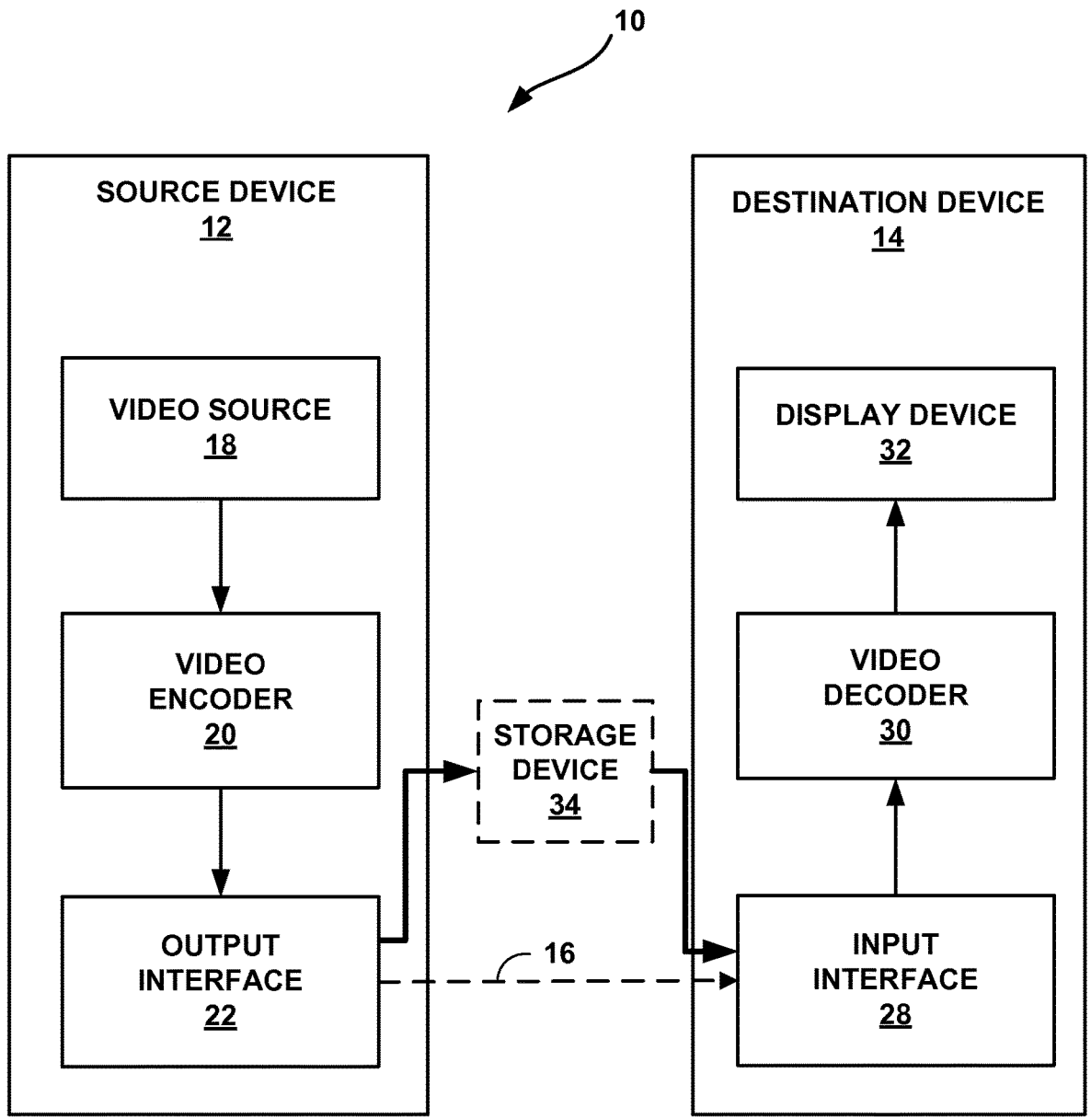
FIG. 1 is a block diagram illustrating an example video encoding and decoding system that may utilize the techniques described in this disclosure.

In general, this disclosure describes techniques related to the selection of an output operation point that is specified by a target output layer set and a temporal ID for multi-layer HEVC extensions.

A bitstream may have multiple coded views. A bitstream may also have support for temporal scalability, that is, different frame rates. The term "operation point" refers to particular set of views to be decoded as well as the temporal subset (e.g., frame rate) to be employed. In some cases, the different layers or views may be multiple versions of the same picture with different image resolutions, such as one layer at 720p and another layer at 1080p. As an example, an original bitstream may include three layers or views at different spatial resolutions and two temporal scalable layers at different frame rates. In this example, the original bitstream includes six operation points with each of the three spatial resolutions available at either frame rate.

Besides representing different views or image resolutions, different layers may also represent different quality representations. For example, a base layer could be 720p resolution video of low quality, with enhancement layer also the same video at 720p resolution but at a higher quality and depending on the base layer for reference.

The term "output operation point" refers to the particular set of views to be output, a set of views to be decoded, as well as the temporal subset to be employed. A "layer identifier list" may be used to identify the layers to be included in the operation point, where each layer corresponds to a separate spatially scalable layer, view, or the like. The layer identifier list may be included in a video parameter set (VPS). The layer identifier list may include a list of nuh_layer_id values, where nuh_layer_id values may be non-negative integers with each layer having a unique nuh_layer_id value, so that each nuh_layer_id value identifies a particular corresponding layer. A highest temporalID may be used to define the temporal subset. The layer identifier list and a target highest temporalID may be used as inputs to extract an operation point from a bitstream.

More specifically, "operation points" are sub-bitstreams that may be extracted from an original bitstream that is scalable temporally and/or with multiple layers and/or views. That is, an operation point is a bitstream that is created from another bitstream by operation of the sub-bitstream extraction process with the another bitstream, a target highest temporalID, and a target layer identifier list as inputs. The bitstream includes one or more views, including the view(s) of the operation point. The target highest temporalID defines the temporal subset. The target layer list includes a set of layers: the set of layers to be decoded for an operation point, and the set of layers to be output for an output operation point. An output operation point is associated with, inter alia, a set of output layers, i.e., the layers identified in the output layer set, which are the layers that are to be output.

The term "layer set" is used to refer to a set of layers to be decoded. A "layer set" is similar to an "operation point" except that the "layer set" includes information about the layers to be decoded and does not includes information about temporal scalability. A layer set can be derived from a bitstream in the same way that an operation point can be derived from a bitstream, but a highest temporalID is not applicable.

The term "output layer set" refers to a set of layers to be output, a layer identifier list identifying the layers in the set, and an identification of the corresponding layer set (where the corresponding layer set identifies the layers to be decoded). The output layer set is similar to the layer set, except that the output layer set identifies layers that are targeted for output (in addition to indicating the corresponding layer set). In some examples, the output layer set identifies the corresponding layer set by including an index to the corresponding layer set, where the corresponding layer set identifies the layers to be decoded. In other examples, the output layer set identifies the corresponding layer set in some other manner.

Layers in the layer set not targeted for output may still be decoded, e.g., when used for inter-layer (or inter-view) prediction. The layers that are targeted for output are a subset of the layers that are to be decoded—one, some or all of the layers to be decoded may be targeted for output. It should be understood that the term "subset" does not necessarily mean that the layer to be output is a strict subset of the layers to be decoded. That is, in some examples, layers to be decoded and the layer to be output are the same. An "output layer set" is similar to an "output operation point" except that the "output layer set" includes information about the layers to be output and does not include information about temporal scalability.

The sub-bitstreams may be extracted from the bitstream based on values of layer identifiers (identifying the layers for the output operation point) and temporal sub-layer identifiers (identifying the temporal subset for the output operation point) that identify the output operation point of the bitstream. The output operation points are signaled in a video parameter set (VPS) within the bitstream. For each of the operation points, an operation point syntax structure specifies a set of layer identifiers used to identify network abstraction layer (NAL) units in the bitstream that belong to a sub-bitstream of a given operation point. In this way, NAL units that make up the sub-bitstream of the given output operation point may be extracted from the original bitstream based on the layer identifiers of the NAL units and the highest temporal ID associated with the output operation point. NAL units are the components of the coded video data; the coded video data is organized into NAL units.

The techniques described in this disclosure include deriving an index to a specific target output layer set in a list of output layer sets, and sending the index to the video decoder. The index may be used to define a set of target output layers used during the decoding process, especially the decoded picture buffer operations of the decoding process. Also, in some examples, the index is used for selection of an appropriate decoded picture buffer (DPB) size (or sub-DPB size) for the DPB operations as a part of the hypothetical reference decoder (HRD) operations and other operations, as discussed in greater detail below.

In some examples, the index is not sent to decoder by including the index in the bitstream itself, but through some "external means", that is, external to the bitstream through which the video itself is sent to the video decoder. As discussed in greater detail below, in various examples, the index may be derived by the server/source device or by one or more components on the client/destination device, and may be sent to the video decoder in different ways in different examples, including MPEG TS or DASH MPD (Media Presentation Description) in some examples, as discussed in greater detail below. In some examples, the index is sent to the video decoder through "external means" rather than sending the index in the bitstream so that the bitstream can operate at multiple operation points rather than one operation point given in the bitstream. In some examples, if the video decoder does not receive the index, there is a default assumption made, such as only decoding and outputting layer zero.

The techniques described in this disclosure further include, in some examples, duplicating the information of output operation points signaled in VPS in a transport layer specification for convenience of session negotiation. In one example, the transport layer specification may be a manifest file, such as the MPD (Media Presentation Description) in Dynamic Adaptive Streaming over HTTP (DASH), including a video decoder configuration in File Format information and/or a descriptor in MPEG-2 TS, for example. As another example, the manifest file may comprise a session description protocol (SDP) message. For each output operation point, the target output views, additional dependent views and the lowest applicable highest temporalID may be signaled.

Based on the external means of defining the index that is possible in the HEVC scalable/multiview/3D extensions, different process may be used in the transport layer; two such example different processes include: one for streaming and one for SDP offer/answer fashion of negotiation.

In streaming applications, e.g., DASH and Real Time Streaming Protocol (RTSP) streaming, the following may apply. A client device receives a description of a media presentation, where the description includes information on output layer sets and, possibly, output operation points based on temporal subsets. The client device may parse the description and choose one of the output operation points and request that output operation point from a server device. The server device may convert the requested output operation point information into a highest temporalID and an index to a specific target output layer set and deliver this information into a video decoder as input from the external means. The server device may send the requested data corresponding to the output operation point.

In applications using a session description protocol (SDP) offer/answer type of negotiation, the following may apply. A sender device may send an invitation to multiple receivers, including Receiver A and Receiver B, with the invitation containing a description of what are the output operation points (e.g., in terms of output views) the sender can provide. The Receivers may select the respective output operation points. For example, Receiver A may choose a set of views to output and Receiver B may also choose a set of views to output. The sender device may encode a bitstream including all views chosen by the receivers, including a description of output layer sets and possibly output operation points based on temporal subsets as well, and sends the description to the receivers. The required output operation points are signaled in the description of the media presentation. Each receiver determines the index of the output layer set it desires and passes the highest temporalID and the index to the output layer set in a list of output layer sets to the decoder of the receiver. In this example, the index is used as the external means in the video decoder.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC). The video coding standards further include Scalable Video Coding (SVC) and Multiview Video Coding (MVC) extensions of ITU-T H.264.

In addition, there is a new video coding standard, namely High-Efficiency Video Coding (HEVC), which the Joint Collaboration Team on Video Coding (JCT-VC) of ITU-T Video Coding Experts Group (VCEG) and ISO/IEC Motion Picture Experts Group (MPEG) has finalized. The latest HEVC draft specification is Working Draft 10, (referred to herein as "HEVC WD10"), incorporated by reference here in its entirety. Bross et al., High Efficiency Video Coding (HEVC) Text Specification Draft 10, April 2013, Incheon, available as of Jul. 12, 2013 from http://phenix.it-sudpari-s.eu/jet/doc_end_user/documents/13_Incheon/wg11/JCTVC-M0432-v3.zip. Although the techniques described in this disclosure are described with respect to the HEVC standard, aspects of this disclosure are not so limited and can be extended to other video coding standards, as well as proprietary video coding techniques.

There are extensions available and being developed for HEVC. For example, a multiview extension to HEVC, namely MV-HEVC, is also being developed by the JCT-3V. A recent Working Draft (WD) of MV-HEVC is WD4 (referred to herein as "MV-HEVC WD4"), incorporated by reference here in its entirety. Tech et al., MV-HEVC Draft Text 4, April 2013, Incheon, available as of Jul. 12, 2013 from http://phenix.it-sudparis.eu/jct2/doc_end_user/documents/4_Incheon/wg11/JCT3V-D1004-v4.zip. A scalable extension to HEVC, namely SHVC, is also being developed by the JCT-VC. A recent Working Draft of SHVC is SHVC Working Draft 2 (referred to herein as "SHVC WD2"), incorporated by reference here in its entirety. Chen et al., SHVC Working Draft 2, April 2013, Incheon, available as of Jul. 12, 2013 from http://phenix.it-sudparis.eu/jct/doc_en-d_user/documents/13_Incheon/wg11/JCTVC-M1008-v3.zip.

FIG. 1 is a block diagram illustrating an example video encoding and decoding system 10 that may utilize the techniques described in this disclosure. As shown in FIG. 1, system 10 includes a source device 12 that generates encoded video data to be decoded at a later time by a destination device 14. Source device 12 and destination device 14 may comprise any of a wide range of devices, including desktop computers, notebook (e.g., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

In the example of FIG. 1, source device 12 includes video source 18, video encoder 20, and output interface 22. Destination device 14 includes input interface 28, video decoder 30, and display device 32. In other examples, source device 12 and destination device 14 may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques of this disclosure may be performed by any digital video encoding and/or decoding device. Although generally the techniques are performed by a video encoding device or a video decoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications.

In each case, the captured, pre-captured, or computer-generated video may be encoded by video encoder 20. The encoded video data may be transmitted directly to destination device 14 via output interface 22 of source device 12. The encoded video data may also (or alternatively) be stored onto a storage device for later access by destination device 14 or other devices, for decoding and/or playback.

Link 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, link 16 may be understood to include one or more computer-readable media of various forms, in various examples. Link 16 may comprise any type of medium or device capable of moving the encoded video data from source device 12 to destination device 14. In one example, link 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

Input interface 28 of destination device 14 receives information from link 16, which may be a computer-readable medium. The information from link 16 may include syntax information defined by video encoder 20, which is also used by video decoder 30, that includes syntax elements that describe characteristics and/or processing of blocks and other coded units, e.g., GOPs. Display device 32 may be integrated with, or external to, destination device 14. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Alternatively, encoded data may be output from output interface 22 to a storage device 34. Similarly, encoded data may be accessed from storage device 34 by input interface. Storage device 34 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 34 may correspond to a file server or another intermediate storage device that may hold the encoded video generated by source device 12. Destination device 14 may access stored video data from storage device 34 via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 34 may be a streaming transmission, a download transmission, or a combination of both.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

Video encoder 20 and video decoder 30 may operate according to a video coding standard, such as the HEVC WD10 standard, and may conform to the HEVC Test Model (HM). Further, video encoder 20 and video decoder 30 may operate according to HEVC extensions, such as MV-HEVC WD4 and SHVC WD2. Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video coding standards include MPEG-2 and ITU-T H.263. In some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

The ITU-T H.264/MPEG-4 (AVC) standard was formulated by the ITU-T Video Coding Experts Group (VCEG) together with the ISO/IEC Moving Picture Experts Group (MPEG) as the product of a collective partnership known as the Joint Video Team (JVT). In some aspects, the techniques described in this disclosure may be applied to devices that generally conform to the H.264 standard. The H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification. The Joint Video Team (JVT) continues to work on extensions to H.264/MPEG-4 AVC.

Video encoder 20 and video decoder 30 each may be implemented as any of a variety of suitable encoder or decoder circuitry, such as one or more microprocessors, digital signal processors (DSPs), application specific integrated circuits (ASICs), field programmable gate arrays (FPGAs), discrete logic circuitry, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device. A device including video encoder 20 and/or video decoder 30 may comprise an integrated circuit, a microprocessor, and/or a wireless communication device, such as a cellular telephone.

The JCT-VC has developed the HEVC standard and is working on extensions to HEVC. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

In general, the working model of the HM describes that a video frame or picture may be divided into a sequence of treeblocks or largest coding units (LCU) that include both luma and chroma samples. Syntax data within a bitstream may define a size for the LCU, which is a largest coding unit in terms of the number of pixels. A slice includes a number of consecutive treeblocks in coding order. A video frame or picture may be partitioned into one or more slices. Each treeblock may be split into coding units (CUs) according to a quadtree. In general, a quadtree data structure includes one node per CU, with a root node corresponding to the treeblock. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU has a similar purpose as a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, PU, or TU, in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square (e.g., rectangular) in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

A leaf-CU may include one or more prediction units (PUs). In general, a PU represents a spatial area corresponding to all or a portion of the corresponding CU, and may include data for retrieving a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. As another example, when the PU is inter-mode encoded, the PU may include data defining one or more motion vectors for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

A leaf-CU having one or more PUs may also include one or more transform units (TUs). The transform units may be specified using an RQT (also referred to as a TU quadtree structure), as discussed above. For example, a split flag may indicate whether a leaf-CU is split into four transform units. Then, each transform unit may be split further into further sub-TUs. When a TU is not split further, it may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, a PU may be collocated with a corresponding leaf-TU for the same CU. In some examples, the maximum size of a leaf-TU may correspond to the size of the corresponding leaf-CU.

Moreover, TUs of leaf-CUs may also be associated with respective quadtree data structures, referred to as residual quadtrees (RQTs). That is, a leaf-CU may include a quadtree indicating how the leaf-CU is partitioned into TUs. The root node of a TU quadtree generally corresponds to a leaf-CU, while the root node of a CU quadtree generally corresponds to a treeblock (or LCU). TUs of the RQT that are not split are referred to as leaf-TUs. In general, this disclosure uses the terms CU and TU to refer to leaf-CU and leaf-TU, respectively, unless noted otherwise.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Following quantization, the video encoder may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

Video encoder 20 may further send syntax data, such as block-based syntax data, frame-based syntax data, and GOP-based syntax data, to video decoder 30, e.g., in a frame header, a block header, a slice header, or a GOP header. The GOP syntax data may describe a number of frames in the respective GOP, and the frame syntax data may indicate an encoding/prediction mode used to encode the corresponding frame.

HEVC WD10 also allows for stipulation of a limited number of subsets of the syntax by means of "profiles" and "levels." HEVC WD10 is designed to be generic in the sense that it serves a wide range of applications, bit rates, resolutions, qualities, and services. Applications should cover, among other things, digital storage media, television broadcasting and real-time communications. In the course of creating HEVC WD10, various requirements from typical applications have been considered, necessary algorithmic elements have been developed, and these have been integrated into a single syntax. Hence, HEVC WD10 will facilitate video data interchange among different applications. Considering the practicality of implementing the full syntax of HEVC WD10, however, the profiles and levels provide a means for limited number of subsets of the syntax.

A "profile" is defined as a subset of the entire bitstream syntax that is specified by HEVC WD10. Within the bounds imposed by the syntax of a given profile, it is still possible to require a very large variation in the performance of encoders and decoders depending upon the values taken by syntax elements in the bitstream. For example, specified size of decoded pictures may require a very large variation in the performance of encoders and decoders. In many applications, it is currently neither practical nor economic to implement a decoder capable of dealing with all hypothetical uses of the syntax within a particular profile.

In order to deal with this problem, "tiers" and "levels" are specified within each profile. A level of a tier is a specified set of constraints imposed on values of the syntax elements in the bitstream. These constraints may be simple limits on values. Alternatively they may take the form of constraints on arithmetic combinations of values (e.g., picture width multiplied by picture height multiplied by number of pictures decoded per second). A level specified for a lower tier is more constrained than a level specified for a higher tier. The same set of levels is defined for all profiles, with most aspects of the definition of each level being in common across different profiles. Individual implementations may, within specified constraints, support a different level for each supported profile. In a different context, level is the value of a transform coefficient prior to scaling. Profiles and levels are described in more detail in Annex A of HEVC WD10.

HEVC WD10 defines a sub-layer as a temporal scalable layer of a temporal scalable bitstream consisting of video coding layer (VCL) network abstraction layer (NAL) units with a particular value of the temporalID variable, and the associated non-VCL NAL units. HEVC WD10 further defines a sub-layer representation as a subset of the bitstream consisting of NAL units of a particular sub-layer and the lower sub-layers.

Subclause 10.1 of HEVC WD10 describes bitstream subsets and an extraction process to generate sub-bitstreams. In general, HEVC WD10 describes extracting sub-bitstreams from the bitstream based on values of layer identifiers and temporal sub-layer identifiers that identify an operation point of the bitstream.

An operation point is a bitstream created from another bitstream by operation of the sub-bitstream extraction process with another bitstream, a target highest temporalID, and a target layer identifier list as inputs. An operation point may be identified by a set of nuh_layer_id values, denoted as OpLayerIdSet, and a temporalID value, denoted as OpTid, and the associated bitstream subset derived as the output of the sub-bitstream extraction process as specified in HEVC WD10 with OpTid and OpLayerIdSet as inputs is independently decodable. If the target highest temporalID of an operation point is equal to the greatest value of temporalID in the layer set associated with the target layer identification list, the operation point is identical to the layer set. Otherwise the operation point is a subset of the layer set.

In some examples, a sub-bitstream extraction process is a specified process by which NAL units in a bitstream that do not belong to a target set, determined by a target highest temporalID and a target layer identifier list, layerIdListTarget, are removed from the bitstream, with the output sub-bitstream consisting of the NAL units in the bitstream that belong to the target set. In some examples, inputs to the sub-bitstream extraction process are a variable tIdTarget and the list targetDecLayerIdSet, and the output of the sub-bitstream extraction process is a sub-bitstream. The sub-bitstream may be derived by removing from the bitstream all NAL units with temporalID greater than tIdTarget or nuh_layer_id not among the values in targetDecLayerIdSet.

Any sub-bitstream that is included in the output of the sub-bitstream extraction process specified in subclause 10.1 of HEVC WD10 with tIdTarget equal to any value in the range of 0 to 6, inclusive, and with targetDecLayerIdSet containing the value 0 conforms to HEVC WD10. A bitstream conforming to HEVC WD10 may contain one or more coded slice NAL units with nuh_layer_id equal to 0 and temporalID equal to 0.

The current MV-HEVC and SHVC specifications have problems on identifying the layers to be output during decoding. First, although multiple output layer sets are signalled in the VPS, the decoding process does not know which output layer set is chosen. Therefore, among the layers to be decoded, given by TargetDecLayerIdList, it is not clear which pictures belonging to which layer can always be set as not for output (with PicOutputFlag equal to 0) and which pictures belonging to which layer are to be output.

Second, although an external means may specify a set of target layers to be output similar as in MVC, this mechanism may have drawbacks in two aspects: the complication of matching an output layer set with the set of target output layers and the instability due to the possibility of not being able to achieve a successful session initialization in one round.

If a set of target output layers are signaled through external means, not only the interface between the client (which may be video encoder 20) and decoder (which may be video decoder 30) consumes a bit more data, but also at the decoder, it is required to match the target output layers with the output layers that the output layer sets in the VPS contain. This process may introduce unnecessary complication at the decoder.

The decoder also needs to take into account the case when the target output layers (as derived by external means) do not match any output layer set. In this case, the decoding process may terminate or derive intelligently an output layer set which is "close" to the target output layers. However this might not be the operation point the client wants and therefore another round of session negotiation is needed.

The following techniques are included in this disclosure to address the above shortcomings for selection of operation points. First, an index to a specific target output layer set may be derived by external means (e.g., the source device or a media application or other component(s) on the destination device). The index may be used to define a set of target output layers used during the decoding process, especially for the decoded picture buffer (DPB) operations. In addition, the index may be used for selection of an appropriate DPB size (or sub-DPB size) for the DPB operations as a part of the HRD operations.

Second, in some examples, for the convenience of session negotiation, the information of output operation points signaled in VPS can be duplicated in transport layer specification, such as Media Presentation Description (MPD) in Dynamic Adaptive Streaming over HTTP (DASH), decoder configuration in File Format and a descriptor in MPEG-2 transport stream (TS). More straightforwardly, in some examples, for each output operation point, the target output views, the additional dependent views and the lowest applicable highest temporalID are signaled.

Third, in some examples, based on the external means that is possible in the HEVC scalable/multiview/3D extensions; two such example different processes include: one for streaming and one for SDP offer/answer fashion of negotiation.

In streaming applications, e.g., DASH and Real Time Streaming Protocol (RTSP) streaming, the following may apply:
  i. A client gets a description of a media presentation (e.g., a manifest file), where the description includes information on output layer sets and, possibly, output operation points based on temporal subsets.
  ii. The client parses the description and chooses one of the output operation points and requests that output operation point.
  iii. A server converts the requested output operation point information into a highest temporalID and an index to a specific output layer set and delivers this information into a video decoder as input from the external means.
  iv. The server sends the requested data corresponding to the output operation point.

The manifest file may include, for example, a media presentation description (MPD) or an SDP message.

In applications using the SDP offer/answer type of negotiation, the following may apply:
  i. A sender sends an invitation to multiple receivers, including receiver A and receiver B, with the invitation containing a description of what are the output operation points (in terms of output views) the sender can provide.
  ii. The receivers decide the respective output operation points. For example, receiver A chooses a set of views to output and receiver B chooses a set of views to output.
  iii. The sender encodes a bitstream including all views chosen by the receivers, including a description of output layer sets and possibly output operation points based on temporal subsets as well, and sends the description to the receivers. The required output operation points are signaled in the description of the media presentation.
  iv. Each receiver figures out the index of the output layer set it desires and passes the highest temporalID and the index to the output layer set to the decoder of the receiver. The index is used as the external means in the decoder.

In some examples, the source device 12 may be the same device that includes the video encoder 20. In other examples, video encoder 20 may be included in a separate device. Source device 12 may store and manage video data that was encoded by a video encoder in a separate device before the encoded video data was received by source device 12. For example, the server discussed above for streaming applications or the sender described above for the SDP offer/answer type of negotiation, does not necessarily have an encoder and may not itself have encoded the video, although it may in some examples.

Figure 7:
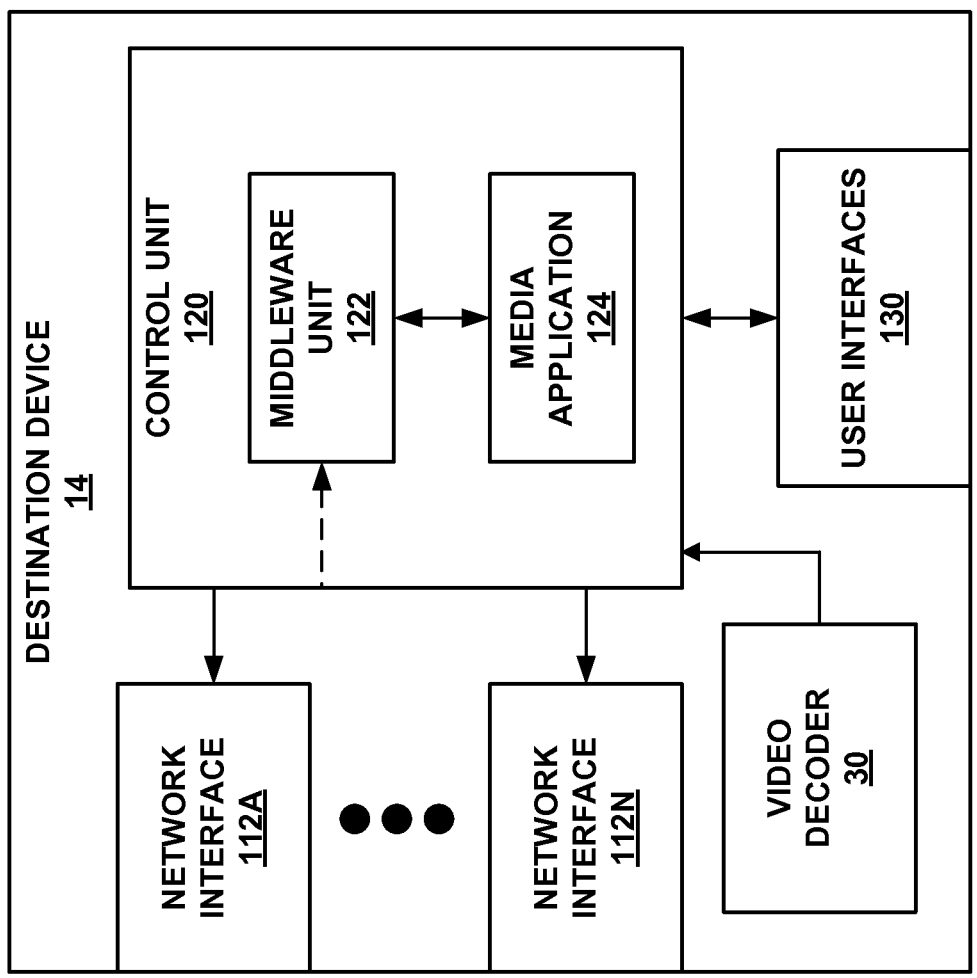
FIG. 7 is a block diagram illustrating an example destination device that further includes a media application.

Although not shown in FIG. 1, destination device 14 may further include a media application. An embodiment of a destination device 14 that includes a media application is shown in FIG. 7 and discussed in greater detail below. Sub-bitstream extraction may be performed in different places in different embodiments, such as in source device 12, in a media application of the destination device, in the video decoder 30 of the destination device, in an upstream Media Aware Network Element (MANE), or some other location. In some examples of streaming applications above, it is the media application of the client that communicates with the server, where the server may be, for example, source device 12. As discussed above, source device 12 does not necessarily contain a video encoder; the video may have been encoded prior to being stored in source device 12. Also, in some examples of SDP offer/answer type of negotiation discussed above, the sender may be, for example, source device 12, and the receivers may be embodiments of destination device 14, where the SDP offer/answer type of negotiation occurs between source device 12 and the media application of each of the destination devices.

Figure 2:
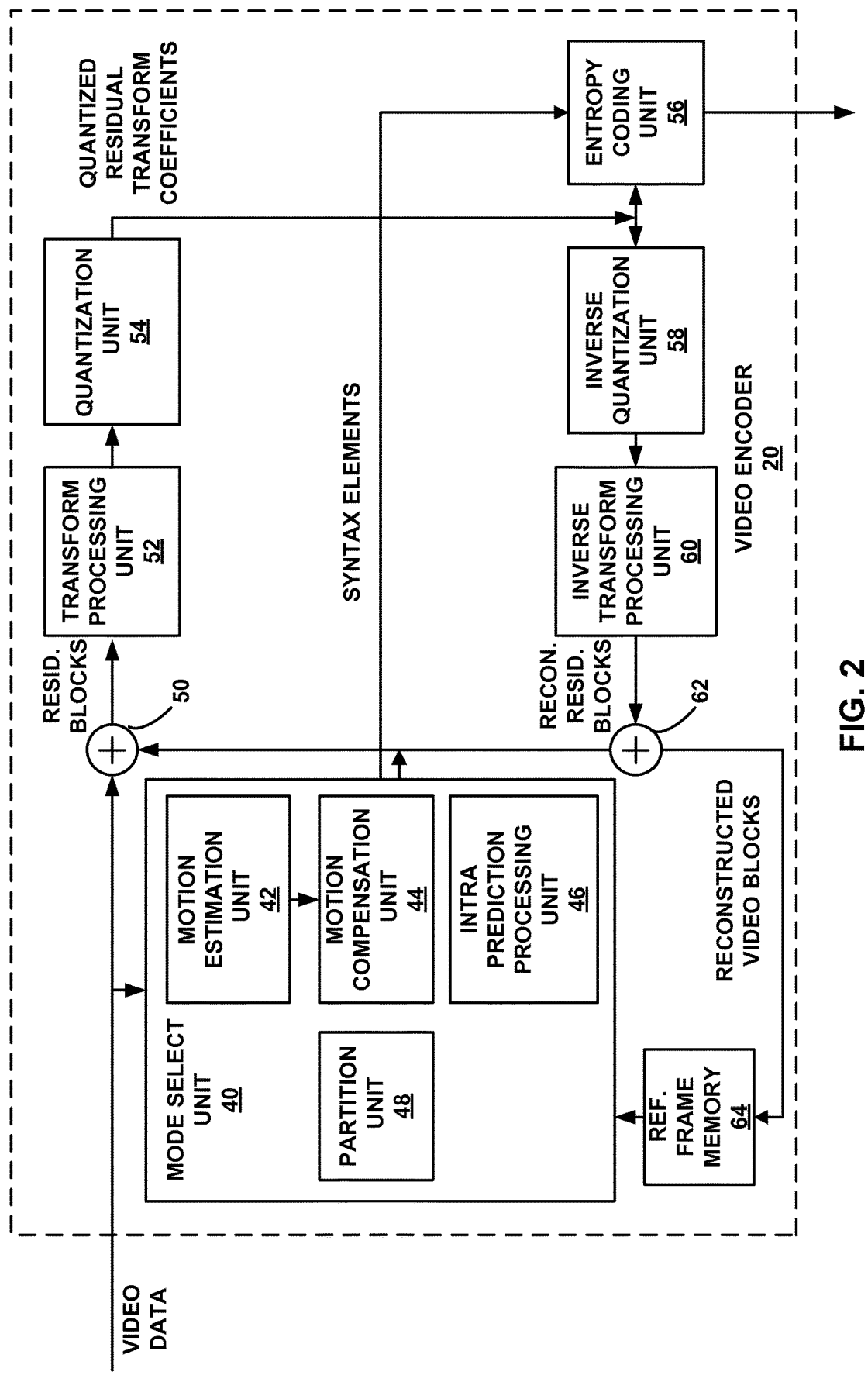
FIG. 2 is a block diagram illustrating an example video encoder that may implement the techniques described in this disclosure.

FIG. 2 is a block diagram illustrating an example of video encoder 20 that may implement the techniques described in this disclosure. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

As shown in FIG. 2, video encoder 20 receives a current video block within a video frame to be encoded. In the example of FIG. 2, video encoder 20 includes mode select unit 40, reference frame memory 64, summer 50, transform processing unit 52, quantization unit 54, and entropy coding unit 56. Mode select unit 40, in turn, includes motion compensation unit 44, motion estimation unit 42, intra-prediction processing unit 46, and partition unit 48. For video block reconstruction, video encoder 20 also includes inverse quantization unit 58, inverse transform processing unit 60, and summer 62. A deblocking filter may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal prediction. Intra-prediction processing unit 46 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into LCUs, and partition each of the LCUs into sub-CUs based on rate-distortion analysis (e.g., rate-distortion optimization). Mode select unit 40 may further produce a quadtree data structure indicative of partitioning of an LCU into sub-CUs. Leaf-node CUs of the quadtree may include one or more PUs and one or more TUs.

Mode select unit 40 may select one of the coding modes, intra or inter, e.g., based on error results, and provides the resulting intra- or inter-coded block to summer 50 to generate residual block data and to summer 62 to reconstruct the encoded block for use as a reference frame. Mode select unit 40 also provides syntax elements, such as motion vectors, intra-mode indicators, partition information, and other such syntax information, to entropy coding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference frame memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference frame memory 64. Motion estimation unit 42 sends the calculated motion vector to entropy coding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra-prediction processing unit 46 may intra-predict a current block, as an alternative to the inter-prediction performed by motion estimation unit 42 and motion compensation unit 44, as described above. In particular, intra-prediction processing unit 46 may determine an intra-prediction mode to use to encode a current block. In some examples, intra-prediction processing unit 46 may encode a current block using various intra-prediction modes, e.g., during separate encoding passes, and intra-prediction processing unit 46 (or mode select unit 40, in some examples) may select an appropriate intra-prediction mode to use from the tested modes.

For example, intra-prediction processing unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction processing unit 46 may calculate ratios from the distortions and rates for the various encoded blocks to determine which intra-prediction mode exhibits the best rate-distortion value for the block.

After selecting an intra-prediction mode for a block, intra-prediction processing unit 46 may provide information indicative of the selected intra-prediction mode for the block to entropy coding unit 56. Entropy coding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used. In any case, transform processing unit 52 applies the transform to the residual block, producing a block of residual transform coefficients. The transform may convert the residual information from a pixel value domain to a transform domain, such as a frequency domain. Transform processing unit 52 may send the resulting transform coefficients to quantization unit 54.

Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy coding unit 56 may perform the scan.

Following quantization, entropy coding unit 56 entropy codes the quantized transform coefficients. For example, entropy coding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy coding unit 56, the encoded bitstream may be transmitted to another device (e.g., video decoder 30) or archived for later transmission or retrieval.

Inverse quantization unit 58 and inverse transform processing unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference frame memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference frame memory 64. The reconstructed video block may be used by motion estimation unit 42 and motion compensation unit 44 as a reference block to inter-code a block in a subsequent video frame.

Video encoder 20 of FIG. 2 represents an example of a video encoder configured to implement one or more of the techniques described herein. In some examples, video encoder 20 signals operation points in a video parameter set (VPS) associated with a bitstream. Operation points refer to sub-bitstreams that may be extracted from an original bitstream that is scalable temporally and/or with multiple layers or views. In HEVC, an operation point may be identified by a set of nuh_layer_id values, denoted as OpLayerIdSet, and a temporalID value, denoted as OpTid. As an example, an original bitstream may include three layers or views at different spatial resolutions and two temporal scalable layers at different frame rates. In this example, the original bitstream includes six operation points with each of the three spatial resolutions available at either frame rate.

In some examples, video encoder 20 generates a bitstream. The bitstream generated by video encoder 20 may include multiple output operation points that can be extracted as sub-bitstreams from the bitstream. The output operation points may include, for example, multiple layers and/or views, as well as multiple frame rates. Video encoder 20 may encode information indicative of the output operation points in the VPS. In some examples, for each of the operation points that video encoder 20 signals in the VPS associated with the bitstream, an operation point syntax structure specifies a set of layer identifiers (IDs) used to identify network abstraction layer (NAL) units in the bitstream that belong to a sub-bitstream of a given operation point. In this way, NAL units that make up the sub-bitstream of the given operation point may be extracted from the original bitstream based on the layer identifiers of the NAL units.

In some cases, video encoder 20 may further encodes hypothetical reference decoder (HRD) parameters that are related to one or more of the operation points, as discussed in greater detail below. In this case, video encoder 20 signals HRD parameter information in the VPS. As discussed in greater detail below, for each of the one or more operation points that have HRD parameters, an HRD parameter syntax structure may specify a set of HRD parameters that defines an HRD used to check conformance of a sub-bitstream of a given operation point.

Figure 3:
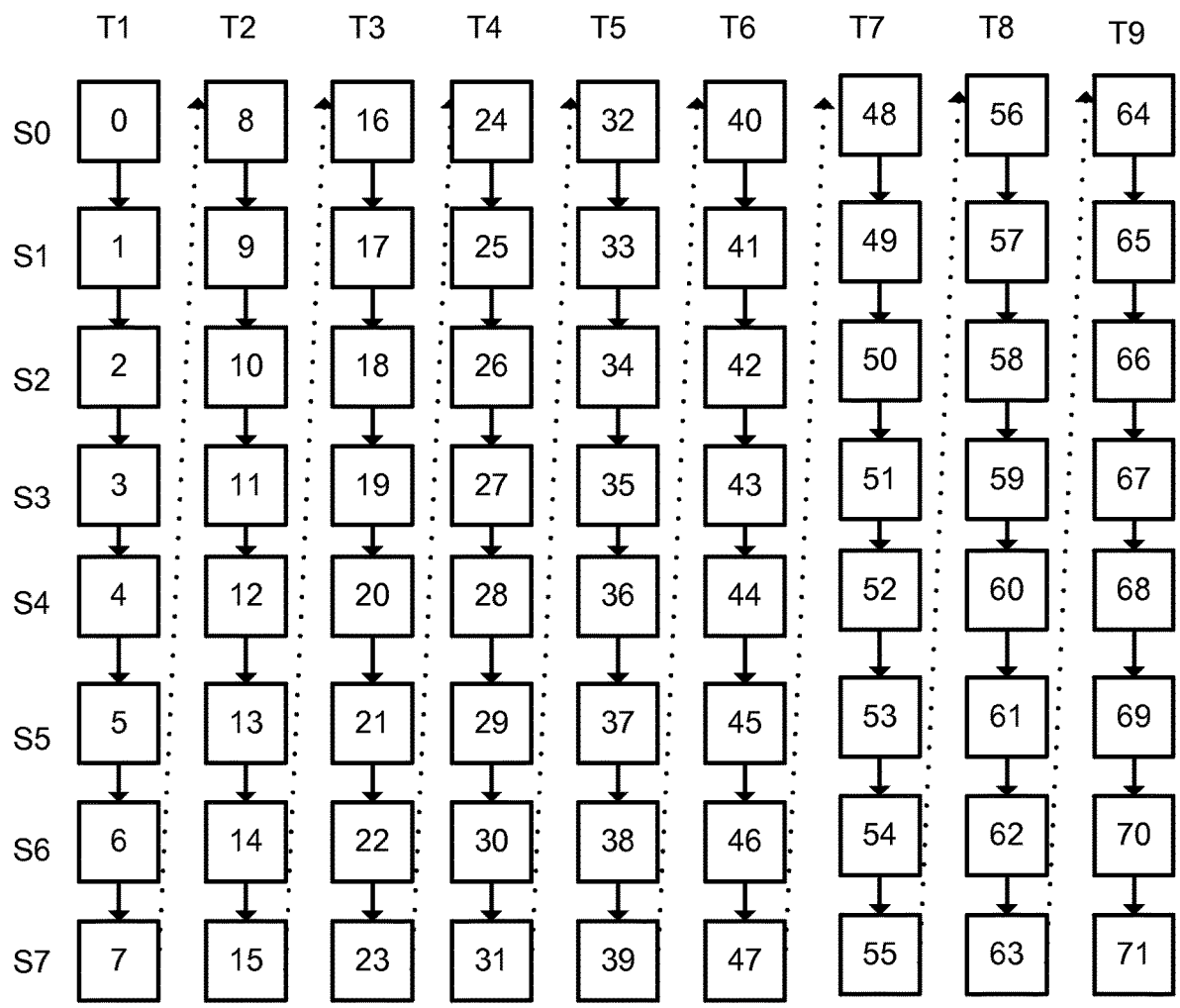
FIG. 3 is a conceptual diagram illustrating an example multiview decoding order, according to techniques of the present disclosure.

FIG. 3 is a conceptual diagram illustrating an example multiview decoding order, according to techniques of the present disclosure. Multiview video coding (MVC) is an extension of H.264/AVC. A typical MVC decoding order (i.e. bitstream order) is shown in FIG. 3. The decoding order arrangement is referred to as time-first coding. Each access unit is defined to contain the coded pictures of all the views for one output time instance. Note that the decoding order of access units may not be identical to the output or display order.

Figure 4:
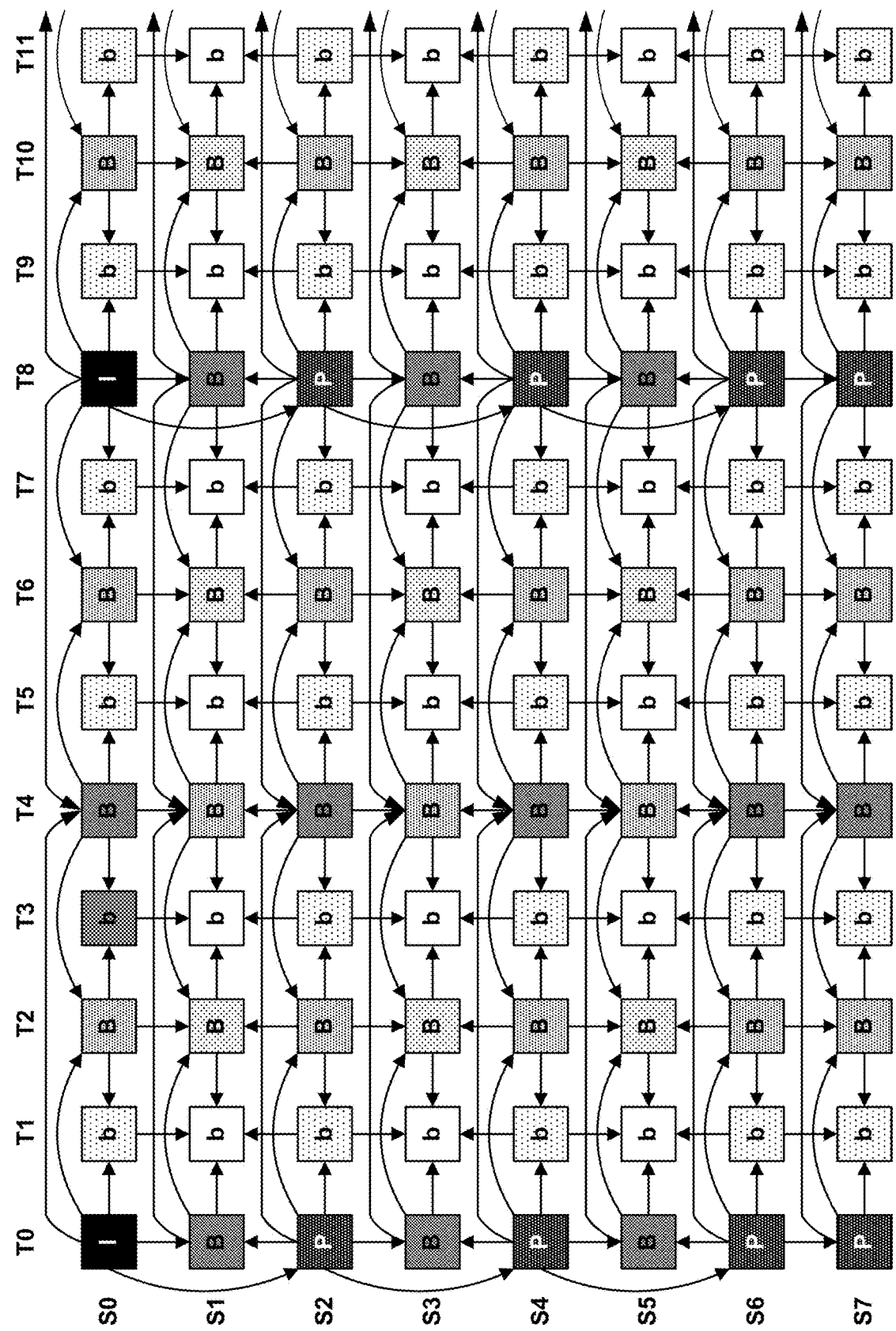
FIG. 4 is a diagram of one example of a MVC prediction structure for multi-view video coding, according to techniques of the present disclosure.

FIG. 4 is a diagram of one example of a MVC (MVC) prediction structure for multi-view video coding. MVC is an extension of H.264/AVC. FIG. 4 illustrates a typical MVC prediction structure (including both inter-picture prediction within each view and inter-view prediction) for multi-view video coding. The MVC prediction structure includes both inter-picture prediction within each view and inter-view prediction. In FIG. 4, predictions are indicated by arrows, where the pointed-to object using the pointed-from object for prediction reference. The MVC prediction structure of FIG. 4 may be used in conjunction with a time-first decoding order arrangement. In a time-first decoding order, each access unit may be defined to contain coded pictures of all the views for one output time instance. The decoding order of access units are not necessarily identical to the output or display order.

In MVC, the inter-view prediction is supported by disparity motion compensation, which uses the syntax of the H.264/AVC motion compensation, but allows a picture in a different view to be put as a reference picture. Coding of two views could be supported also by MVC. An MVC encoder may take more than two views as a 3D video input and an MVC decoder can decode multi-view representation. A renderer with an MVC decoder can decode 3D video content with multiple views.

Pictures in the same access unit (i.e., with the same time instance) can be inter-view predicted in MVC. When coding a picture in one of the non-base views, a picture may be added into a reference picture list if it is in a different view but with a same time instance. An inter-view prediction reference picture may be put in any position of a reference picture list, just like any inter-prediction reference picture.

As shown in FIG. 4, a view component can use the view components in other views for reference. In MVC, inter-view prediction may be realized as if the view component in another view is an inter-prediction reference. The potential inter-view references may be signaled in the Sequence Parameter Set (SPS) MVC extension. The potential inter-view references may be modified by the reference picture list construction process, which enables flexible ordering of the inter-prediction or inter-view prediction references. Table 1 below shows an example SPS MVC extension.

TABLE 1

Example SPS MVC extension

| seq_parameter_set_mvc_extension( ) { | Descriptor |
|---|---|
|   num_views_minus1 | ue(v) |
|   for( i = 0; i <= num_views_minus1; i++ ) | |
|     view_id[ i ] | ue(v) |
|   for( i = 1; i <= num_views_minus1; i++ ) { | |
|     num_anchor_refs_l0[ i ] | ue(v) |
|     for( j = 0; j < num_anchor_refs_l0[ i ]; j++ ) | |
|       anchor_ref_l0[ i ][ j ] | ue(v) |
|     num_anchor_refs_l1[ i ] | ue(v) |
|     for( j = 0; j < num_anchor_refs_l1[ i ]; j++ ) | |
|       anchor_ref_l1[ i ][ j ] | ue(v) |
|   } | |
|   for( i = 1; i <= num_views_minus1; i++ ) { | |
|     num_non_anchor_refs_l0[ i ] | ue(v) |
|     for( j = 0; j < num_non_anchor_refs_l0[ i ]; j++ ) | |
|       non_anchor_ref_l0[ i ][ j ] | ue(v) |
|     num_non_anchor_refs_l1[ i ] | ue(v) |
|     for( j = 0; j < num_non_anchor_refs_l1[ i ]; j++ ) | |
|       non_anchor_ref_l1[ i ][ j ] | ue(v) |
|   } | |
|   num_level_values_signalled_minus1 | ue(v) |
|   for( i = 0; i <= num_level_values_signalled_minus1; i++ ) { | |
|     level_idc[ i ] | u(8) |
|     num_applicable_ops_minus1[ i ] | ue(v) |
|     for( j = 0; j <= num_applicable_ops_minus1[ i ]; j++ ) { | |
|       applicable_op_temporal_id[ i ][ j ] | u(3) |
|       applicable_op_num_target_views_minus1[ i ][ j ] | ue(v) |
|       for( k = 0; k <= applicable_op_num_target_views_minus1[ i ][ j ]; k++ ) | |
|         applicable_op_target_view_id[ i ][ j ][ k ] | ue(v) |
|       applicable_op_num_views_minus1[ i ][ j ] | ue(v) |
|     } | |
|   } | |
| } | |

In the SPS MVC extension, for each view, the number of views that can be used to form reference picture list 0 and reference picture list 1 are signaled. Prediction relationship for an anchor picture, as signaled in the SPS MVC extension, can be different from the prediction relationship for a non-anchor picture (signaled in the SPS MVC extension) of the same view.

For selection of target output views in MVC, it is assumed that the target output views are known by external means. These target output views known by external means can be derived, for example, as a result of session negotiation and transited from a client to an MVC decoder with a certain interface.

HEVC, in contrast, has a Video Parameter Set (VPS) extension for the MV-HEVC WD4 and the SHVC WD2. In the VPS extension of MV-HEVC WD4 and SHVC WD2, a number of output layer sets are signaled in a way that for a given layer set (of the layers to be decoded), multiple output layer sets can be signaled by identifying which layers are a target output layer (output_layer_flag[IsIdx][j]). Detailed syntax design in accordance with the Video Parameter Set (VPS) extension of the MV-HEVC WD4 and SHVC WD2 is shown in the VPS extension syntax table shown below as Table 2. For output layer sets with index 0 to vps_number_layer_sets_minus1, the corresponding layers sets are those indexed 0 to vps_number_layer_sets_minus1, respectively. In the Video Parameter Set (VPS) extension of the MV-HEVC WD4 and SHVC WD2, the target output layers for these output layer sets are inferred based on the value of default_one_target_output_layer_flag. In accordance with the Video Parameter Set (VPS) extension of the MV-HEVC WD4 and SHVC WD2, if default_one_target_output_layer_flag is equal to 0, then all the layers in these output layer sets are target output layers; if default_one_target_output_layer_flag is equal to 1, then only the layer with highest layer id in those output layer sets is the target output layer.

TABLE 2

Video Parameter Set (VPS) extension syntax

| vps_extension( ) { | Descriptor |
|---|---|
|   while( !byte_aligned( ) ) | |
|     vps_extension_byte_alignment_reserved_one_bit | u(1) |
|   avc_base_layer_flag | u(1) |
|   splitting_flag | u(1) |
|   for( i = 0, NumScalabilityTypes = 0; i < 16; i++ ) { | |
|     scalability_mask[ i ] | u(1) |
|     NumScalabilityTypes += scalability_mask[ i ] | |
|   } | |
|   for( j = 0; j < ( NumScalabilityTypes − splitting_flag ); j++ ) | |
|     dimension_id_len_minus1[ j ] | u(3) |
|   vps_nuh_layer_id_present_flag | u(1) |
|   for( i = 0; i <= vps_max_layers_minus1; i++ ) { | |
|     if( vps_nuh_layer_id_present_flag && i > 0 ) | |
|       layer_id_in_nuh[ i ] | u(6) |
|     if( !splitting_flag ) | |
|       for( j = 0; j < NumScalabilityTypes; j++ ) | |
|         dimension_id[ i ][ j ] | u(v) |
|   } | |
|   for( i = 1; i <= vps_max_layers_minus1; i++ ) | |
|     for( j = 0; j < i; j++ ) | |
|       direct_dependency_flag[ i ][ j ] | u(1) |
|   for( i = 0; i < vps_max_layers_minus1; i++ ) | |
|     max_tid_il_ref_pics_plus1[ i ] | u(3) |
|   vps_number_layer_sets_minus1 | u(10) |
|   vps_num_profile_tier_level_minus1 | u(6) |
|   for( i = 1; i <= vps_num_profile_tier_level_minus1; i ++ ) { | |
|     vps_profile_present_flag[ i ] | u(1) |
|     if( !vps_profile_present_flag[ i ] ) | |
|       profile_ref_minus1[ i ] | u(6) |
|     profile_tier_level( vps_profile_present_flag[ i ], vps_max_sub_layers_minus1 ) | |
|   } | |

TABLE 2-continued

Video Parameter Set (VPS) extension syntax

| vps_extension( ) { | Descriptor |
|---|---|
|   numOutputLayerSets = vps_number_layer_sets_minus1 + 1 | |
|   more_output_layer_sets_than_default_flag | u(1) |
|   if( more_output_layer_sets_than_default_flag ) { | |
|     num_add_output_layer_sets_minus1 | u(10) |
|     numOutputLayerSets += num_add_output_layer_sets_minus1 + 1 | |
|   } | |
|   if( numOutputLayerSets > 1 ) | |
|     default_one_target_output_layer_flag | u(1) |
|   for( i = 1; i < numOutputLayerSets; i++ ) { | |
|     if( i > vps_number_layer_sets_minus1 ) { | |
|       output_layer_set_idx_minus1[ i ] | u(v) |
|       lsIdx = output_layer_set_idx_minus1[ i ] + 1 | |
|       for( j = 0 ; j < NumLayersInIdList[ lsIdx ] − 1; j++) | |
|         output_layer_flag[ i ][ j ] | u(1) |
|     } | |
|     profile_level_tier_idx[ i ] | u(v) |
|   } | |
|   max_one_active_ref_layer_flag | u(1) |
|   direct_dep_type_len_minus2 | ue(v) |
|   for( i = 1; i <= vps_max_layers_minus1; i++ ) | |
|     for( j = 0; j < i; j++ ) | |
|       if( direct_dependency_flag[ i ][ j ] ) | |
|         direct_dependency_type[ i ][ j ] | u(v) |
|   vps_shvc_reserved_zero_flag | u(1) |
| } | |

A layer identifier list for target output layers is identified by an index (outPutLayerIdx) to the output layers signaled in the VPS extension.

A layer identifier list is a list of nuh_layer_id values that is associated with a layer set or an operation point and can be used as an input to the sub-bitstream extraction process.

A layer set is a set of layers represented within a bitstream created from another bitstream by operation of the sub-bitstream extraction process with the another bitstream, the target highest temporalID equal to 6, and the target layer identifier list equal to the layer identifier list associated with the layer set as inputs. A layer set is the set of layers to be decoded.

An output layer set is a layer set that is associated with a set of output layers, and which also identifies the corresponding layer set. A layer set identifies the set of layers to be decoded, and the output layer set identifies the set of layers to be output (as well as identifying the corresponding layer set).

An output operation point is a bitstream that is created from another bitstream by operation of the sub-bitstream extraction process with the another bitstream, a target highest temporalID, and a target layer identifier list as inputs, and that is associated with a set of target output layers. Thus, each output operation point is associated with a set of target output layers.

An operation point is a bitstream that is created from another bitstream by operation of the sub-bitstream extraction process with the another bitstream, a target highest temporalID, and a target layer identifier list as inputs, and that is associated with layer set. Thus, each operation point is associated with layer set. An output operation point is associated with an output layer set, and an operation point is associated with a layer set.

Many permutations of output layer sets may be possible for a given bitstream. For example, suppose a sub-bitstream is extracted from a bitstream including the eight views of FIG. 4. The sub-bitstream may have three layers (views), with nuh_layer_id values of 0, 1, and 2. In one example, it may be possible to output any of the layers alone, or to output both layer 0 and layer 1, or to output layer 0 and layer 2, or to output both layer 1 and layer 2, or to output all three of layers 0, 1, and 2. In this case, there may be up to seven output layer sets: one identifying layer 0 as the only output layer, one identifying layer 1 as the only output layer, one identifying layer 2 as the only output layer, one identifying layer 0 and layer 1 as the output layers, one identifying layer 0 and layer 2 are the output layers, one identifying layers 1 and 2 as the output layers, and one identifying layers 0, 1, and 2 as the output layers. In one example, layer 0 may be an inter-view reference layer which must be decoded in order to decoder either layer 1 or layer 2. In one example, if the output layer set identifies layer 2 as the only output layer, layer 0 must still be decoded for inter-view reference. In this particular example, the output layer set identifies layer 2 as the output layer, and the layer set identifies layer 0 and layer 2. The output layer set also identifies the corresponding layer set. It should be noted that because layer 1 is not used as a reference view for either of layers 0 or 2, an operation point may be defined including only layers 0 and 2, if layer 2 is included in the output layer set.

In the above example, there were seven output layer sets, but in other examples, there may have been less than seven output sets, for example, depending on which layers and how many layers can be output simultaneously.

An example video parameter set (VPS) raw byte sequence payload (RBSP) semantics is as follows. The flag layer_id_included_flag[i][j] equal to 1 specifies that the value of nuh_layer_id equal to j is included in the layer identifier list layerSetLayerIdList[i]. The flag layer_id_included_flag[i][j] being equal to 0 specifies that the value of nuh_layer_id equal to j is not included in the layer identifier list layerSetLayerIdList[i].

The value of numLayersInIdList[0] is set equal to 1 and the value of layerSetLayerIdList[0][0] is set equal to 0.

For each value of i in the range of 1 to vps_num_layer_sets_minus1, inclusive, the variable numLayersInIdList[i] and the layer identifier list layerSetLayerIdList[i] are derived as follows:

```
n = 0
for( m = 0; m <= vps_max_layer_id; m++ )
    if( layer_id_included_flag[ i ][ m ] )              (7-3)
        layerSetLayerIdList[ i ][ n++ ] = m
numLayersInIdList[ i ] = n
```

For each value of i in the range of 1 to vps_num_layer_sets_minus1, inclusive, numLayersInIdList[i] shall be in the range of 1 to vps_max_layers_minus1+1, inclusive.

When numLayersInIdList[iA] is equal to numLayersInIdList[iB] for any iA and iB in the range of 0 to vps_num_layer_sets_minus1, inclusive, with iA not equal to iB, the value of layerSetLayerIdList[iA][n] shall not be equal to layerSetLayerIdList[iB][n] for at least one value of n in the range of 0 to numLayersInIdList[iA], inclusive.

A layer set is identified by the associated layer identifier list. The $i^{th}$ layer set specified by the VPS is associated with the layer identifier list layerSetLayerIdList[i], for i in the range of 0 to vps_num_layer_sets_minus1, inclusive.

The algorithm above identifies the layers that are included in a layer set by determining, for each possible value of nuh_layer_id, whether the layer is included in the layer set or not.

A layer set consists of all operation points that are associated with the same layer identifier list.

Figure 5:
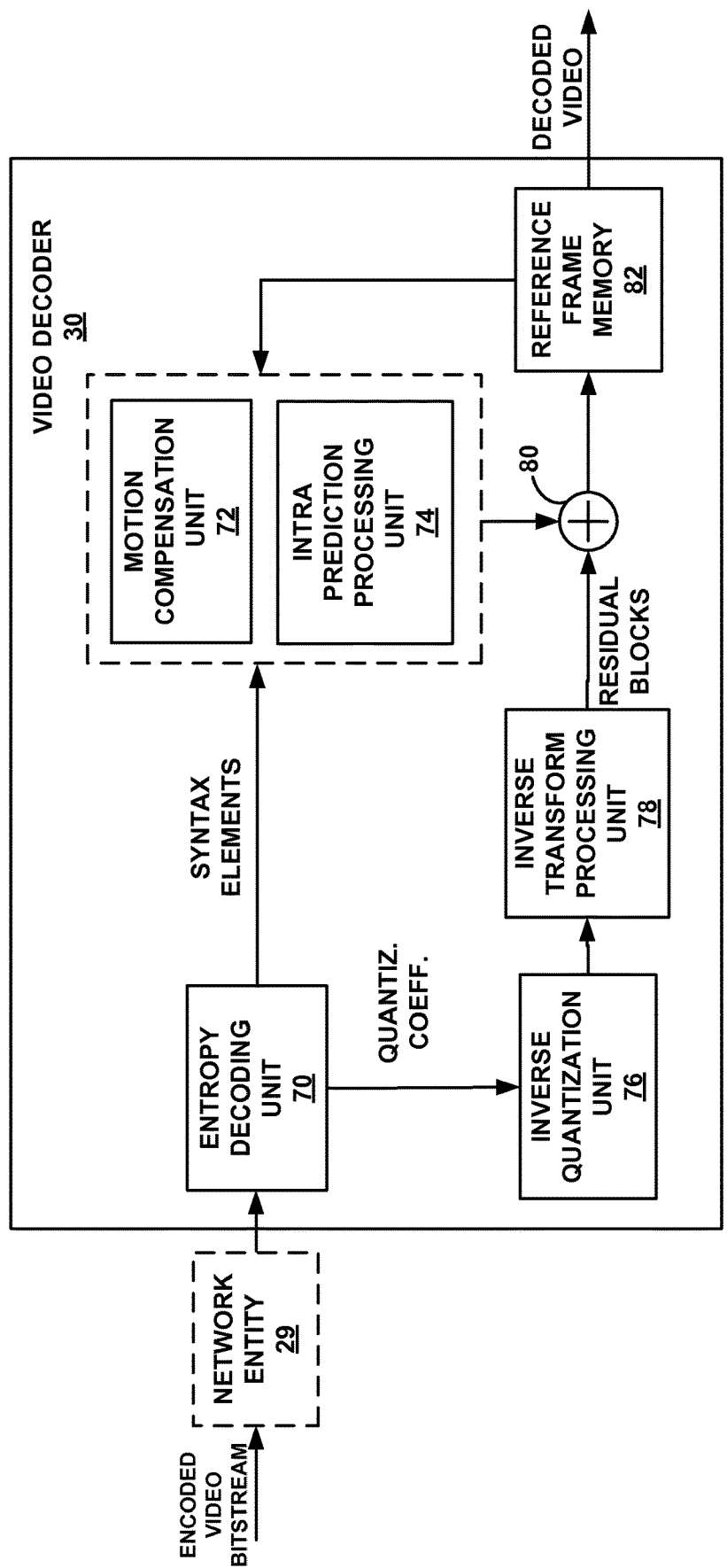
FIG. 5 is a block diagram illustrating an example video decoder that may implement the techniques described in this disclosure.

FIG. 5 is a block diagram illustrating an example of video decoder 30 that may implement the techniques described in this disclosure. In the example of FIG. 5, video decoder 30 includes an entropy decoding unit 70, motion compensation unit 72, intra prediction processing unit 74, inverse quantization unit 76, inverse transformation processing unit 78, reference frame memory 82 and summer 80. Video decoder 30 may, in some examples, perform a decoding pass generally reciprocal to the encoding pass described with respect to video encoder 20, as shown in FIG. 2.

During the decoding process, video decoder 30 receives an encoded video bitstream that represents video blocks of an encoded video slice and associated syntax elements from video encoder 20. Video decoder 30 may receive the encoded video bitstream from a network entity 29. Network entity 29 may, for example, be a server, a media-aware network element (MANE), a video editor/splicer, or other such device configured to implement one or more of the techniques described above. Network entity 29 may include an external means configured to perform the techniques of this disclosure. As described above, some of the techniques described in this disclosure may be implemented by network entity 29 prior to network entity 29 transmitting the encoded video bitstream to video decoder 30. In some video decoding systems, network entity 29 and video decoder 30 may be parts of separate devices, while in other instances, the functionality described with respect to network entity 29 may be performed by the same device that comprises video decoder 30.

Entropy decoding unit 70 of video decoder 30 entropy decodes the bitstream to generate quantized coefficients, motion vectors or intra-prediction mode indicators, and other syntax elements. Entropy decoding unit 70 forwards the motion vectors to and other syntax elements to motion compensation unit 72. Video decoder 30 may receive the syntax elements at the video slice level and/or the video block level.

When the video slice is coded as an intra-coded (I) slice, intra prediction processing unit 74 may generate prediction data for a video block of the current video slice based on a signaled intra prediction mode and data from previously decoded blocks of the current frame or picture. When the video frame is coded as an inter-coded (i.e., B, P or GPB) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in reference frame memory 82.

Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice or P slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Inverse quantization unit 76 inverse quantizes, i.e., de-quantizes, the quantized transform coefficients provided in the bitstream and decoded by entropy decoding unit 70. The inverse quantization process may include use of a quantization parameter $QP_Y$ calculated by video decoder 30 for each video block in the video slice to determine a degree of quantization and, likewise, a degree of inverse quantization that should be applied. Inverse transform processing unit 78 applies an inverse transform, e.g., an inverse DCT, an inverse integer transform, or a conceptually similar inverse transform process, to the transform coefficients in order to produce residual blocks in the pixel domain.

After motion compensation unit 72 generates the predictive block for the current video block based on the motion vectors and other syntax elements, video decoder 30 forms a decoded video block by summing the residual blocks from inverse transform processing unit 78 with the corresponding predictive blocks generated by motion compensation unit 72. Summer 90 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference frame memory 82, which stores reference pictures used for subsequent motion compensation. Reference frame memory 82 also stores decoded video for later presentation on a display device, such as display device 32 of FIG. 1.

Figure 9:
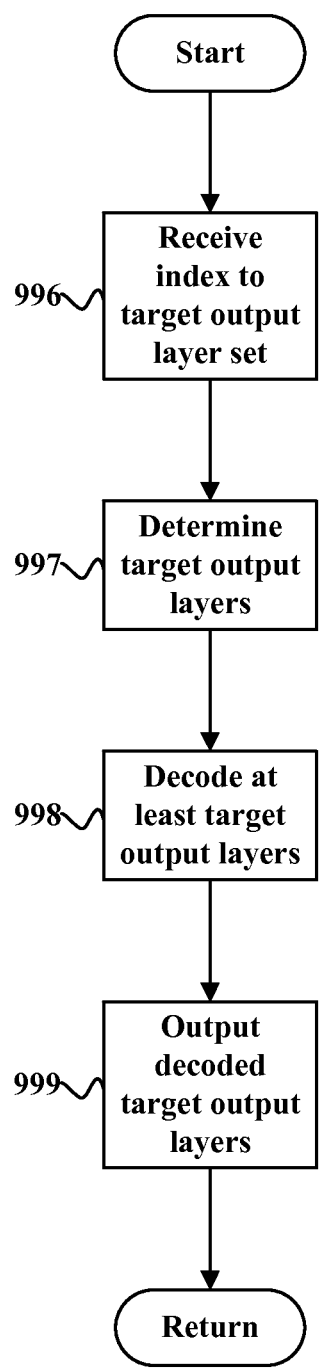
FIG. 9 is a flow diagram illustrating an example process of decoding video data.

A general decoding process that video decoder 30 may employ is provided in greater detail below. One example process that may be performed by video decoder 30 is illustrated in FIG. 9 and discussed in greater detail below.

Figure 6:
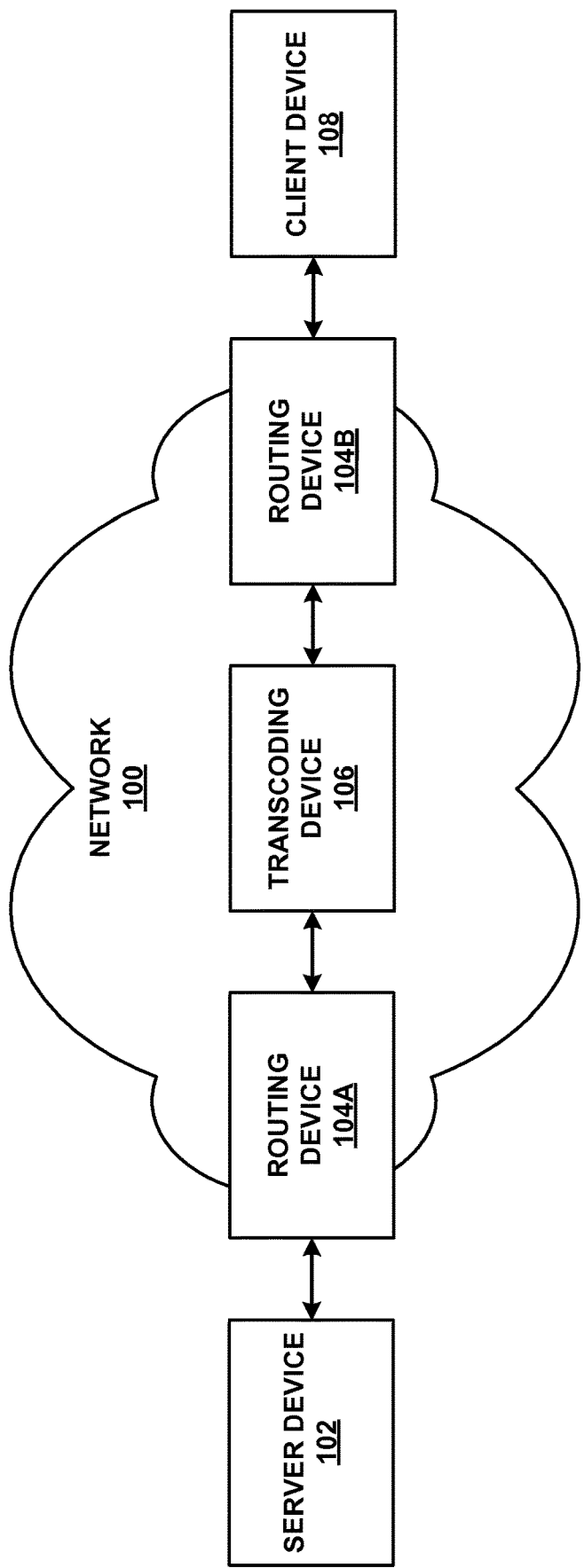
FIG. 6 is a block diagram illustrating an example set of devices that form part of a network.

FIG. 6 is a block diagram illustrating an example set of devices that form part of network 100. In this example, network 100 includes routing devices 104A, 104B (routing devices 104) and transcoding device 106. Routing devices 104 and transcoding device 106 are intended to represent a small number of devices that may form part of network 100. Other network devices, such as switches, hubs, gateways, firewalls, bridges, and other such devices may also be included within network 100. Moreover, additional network devices may be provided along a network path between server device 102 and client device 108. Server device 102 may correspond to source device 12 (FIG. 1), while client device 108 may correspond to destination device 14 (FIG. 1), in some examples.

In general, routing devices 104 implement one or more routing protocols to exchange network data through network 100. In some examples, routing devices 104 may be configured to perform proxy or cache operations. Therefore, in some examples, routing devices 104 may be referred to as proxy devices. In general, routing devices 104 execute routing protocols to discover routes through network 100. By executing such routing protocols, routing device 104B may discover a network route from itself to server device 102 via routing device 104A.

FIG. 7 is a block diagram illustrating an example of destination device/client device 14 that further includes a media application (124).

Destination device 14 also includes control unit 120 and user interfaces 130. Control unit 120 may represent one or more hardware-based processing units, e.g., one or more general purpose microprocessors, processing cores, digital signal processors (DSPs), application specific integrated circuits (ASICs), field programmable logic arrays (FPGAs), or other equivalent integrated or discrete logic circuitry, alone or in any combination. Likewise, functionality attributed to control unit 120, including units or modules within control unit 120 (such as middleware unit 122 and media application 124), may be implemented solely or in any combination of hardware, software, and/or firmware. When implemented in software or firmware, it is presumed that control unit 120 includes requisite hardware, e.g., one or more computer-readable media for storing instructions and one or more hardware-based processors for executing the instructions.

User interfaces 130 may include one or more user interfaces such as a display, a touchscreen, speakers, a microphone, pointing devices such as a mouse or touchpad, a keyboard, or the like. Although one particular configuration for video decoder 30 is shown in FIG. 7, destination device 14 may include video decoder 30 in one or more different locations than shown in FIG. 7, such as within control unit 120, or separate from control unit 120 and between control unit 120 and user interfaces 130. Alternatively, the video decoder(s) 30 may be provided between middleware unit 122 and media application 124.

In some examples, control unit 120 includes middleware unit 122 and a media application 124. Media application 124 may correspond to an application for playing media data, such as video and/or audio data. When playing the media data, media application 124 may send decoded media data to user interfaces 130 for output. Furthermore, media application 124 may retrieve media data from middleware unit 122. Media application 124 may, for example, be configured to perform DASH, e.g., to retrieve media data from middleware unit 122 using techniques of DASH. Middleware unit 122 may generally act as an intermediate unit between media application 124 and network interfaces 112, such that the functionality for obtaining media data from server devices 102 via networks 104, 106 can be abstracted from media application 124. That is, media application 124 need not interact with modules or units related to networks 104, 106, such as network interfaces 112. Instead, media application 124 may interact with middleware unit 122, and middleware unit 122 may be responsible for controlling network interactions via network interfaces 112 on behalf of media application 124.

In some examples, media application 124 may be performed sub-bitstream extraction, as discussed in greater detail above and below.

Media application 124 may communicate with a server device, such as source device 10 of FIG. 1, during a session negotiation that occurs prior to video data being sent, as discussed in greater detail above and below.

Figure 8:
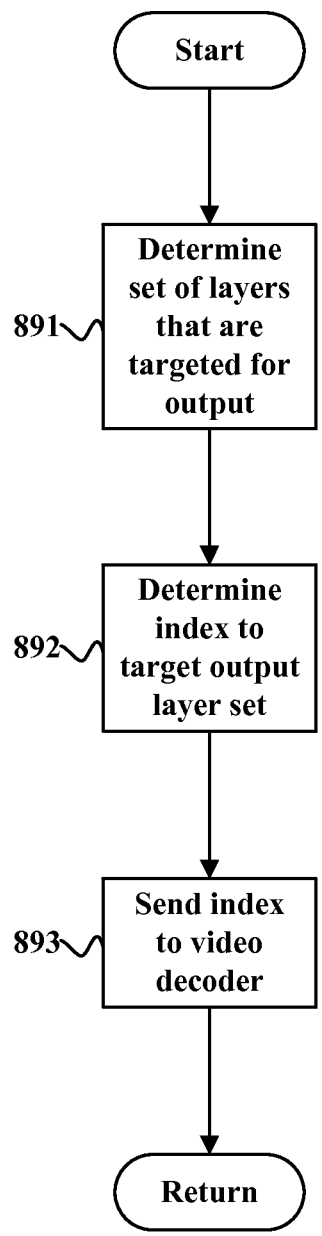
FIG. 8 is a flow diagram illustrating an example process for processing video data.

FIG. 8 is a flow diagram illustrating an example process (890) for processing video data. After a start block, the process proceeds to block 891, where a set of layers that are targeted for output is determined. The process then moves to block 892, where an index to a target output layer set in a list of output layer sets is determined so that the target output layer set represents the determined set of layers that are targeted for output. The process then advances to block 893, where the index is sent to a video decoder. The process then proceeds to a return block, where other processing is resumed.

Process 890 may be performed, for example, a server device and/or a source device, such as source device 12 of FIG. 1. Process 890 illustrates an example process from the perspective of a server/source device, which may be part of a communication between the server/source device and a media application, such as media application 124 of FIG. 7.

In some examples, before a session begins, and before any video data is sent, a session negotiation may occur, for example between a source device (e.g., source device 12 of FIG. 1) and a destination device (e.g., destination device 14 of FIG. 1 or destination device 14 of FIG. 7). In some examples, the session negotiation may be performed between the source device and a media application of the client device (e.g., media application 124 of FIG. 7). The negotiation session may begin, for example, by the destination device making an inquiry to the source device. In response to the inquiry, the source device may send to the decoder information such as options related to possible output operation points that can be provided for particular video data. This may include information such as information regarding which layers can be supported, how many layers the bitstream has, which frame rates are supported, and/or the like.

In response, the destination device may select an output operation point, based, for example, on the needs and requirements of the destination device. For example, the selection may be based on what operation points can be decoded by the decoder, and based a controllable setting as to which of those operation points that can be decoded should preferably be output. The destination device determines, for example, decoding and rendering capabilities of the client device. Decoding capabilities may include what codec(s) are available, as well as profiles and levels of the codec(s) supported by the decoder. Rendering capabilities may include how many views can be output by the display, frame rates, screen size (for resolution), etc. After determining this, the client determines which output operation points satisfy these requirements. In some examples, the destination device may also determine available bandwidth and bitrates for the various representations, and select the representation with the highest bitrate that does not exceed the available bandwidth. Based on, for example, one or more of these factors, the destination device selects an output operation point.

In some examples, after selecting the output operation point, the destination device may communicate the selected output operation point to the source device. In some examples, the source device 12 receives the selection of the output operation point from the destination device, the source device may send to the video decoder of the destination device the list of output layer sets, an index to a target output layer sets in the list of output layer sets based on the selected output operation point, and a highest temporalID corresponding to the selected output operation point.

Alternatively, in some examples, instead of the destination device communicating the selected output operation device to the source device, and the source device sending information including the index to a target output layer set in the list of output layer sets to the video coder based on the selection, there may be information at the file format level (e.g., the MPD in DASH) that indicates URLs of files (and byte ranges within those files) that correspond to the selected operation point. For instance, if a client device selects layers 0 and 2 for output, the MPD may identify which files correspond to data for those layers. If only a subset of the available temporal layers were desired, the MPD may also describe byte ranges of the files that correspond to those temporal layers.

In various examples, the index to the target output layer set of the list of output layer sets may be derived and sent to the decoder in different ways.

In some examples, the server sends the media application a description of a media presentation, where the description includes information about output layer sets and/or output operation points, the media application parses the description and then selects one of the output operation points and/or output layer sets. The media application then communicates the selection of the output operation point and/or output layer set to the server. The server then converts the selected output operation point and/or output layer set to the index to the target output layer set of the list of output layer sets, and the server then delivers the index to the video decoder.

While the above example discussed the media application selecting one of the output operation points and/or output layer sets, in some examples, his selection may be determined by some other capability/message exchange with other components within destination device 14.

In other examples, the server sends the media application a description of a media presentation, where the description includes information and output layer sets and/or output operation points, the media application parses the description and selects one of the output operation points and/or output layer sets. The media application then converts the selected output operation point and/or output layer set to the index to the target output layer set of the list of output layer sets. The media application then sends the index to the video decoder.

As discussed above, in some examples, the index is determined by the server device/source device based on a specific request from the destination device, and in other examples, the index is determined by the client application and/or one or more other components of the destination device based on a manifest file received by the destination device from the server device/source device.

The list of output layer sets is a list. The list contains as elements indications of all valid permutations of groups of layers that can be simultaneously output, with a separate element for each valid permutation of groups of layer that can be simultaneously output. In some examples, the layer sets are identified by nuh_layer_id values, where the nuh_layer_id values are non-negative integers for which each layer has a unique nuh_layer_id value. For example, suppose there is a bitstream which has three layers, with nuh_layer_id values of 0, 1, and 2. Suppose further that it is possible to output any of the layers alone, or to output both layer 0 and layer 1, or to output both layer 1 and layer 2. In this case, the list of output layer sets would include five elements: one identifying layer 0 as the only output layer, one identifying layer 1 as the only output layer, one identifying layer 2 as the only output layer, one identifying layer 0 and layer 1 as the output layers, and another identifying layer 0 and layer 2 as the output layers. However, each element of the list also includes information about the corresponding layer set.

More specifically, in some examples, each element in the output layer list also includes an index to the layer set that corresponds to that output layer set. As previously discussed, the output layer set itself identifies the layers that are to be output. The layer set identifies the layers that are to be decoded. Every layer that is output must be decoded, but there may be layers that are decoded but that are not output. The output layer set identifies the layers to be output, and also identifies the corresponding layer set in some fashion, such as by including an index to the corresponding layer set. The corresponding layer set identifies the layers to be decoded. The layers to be output are a subset of the layers to be decoded. For example, in some cases, it may not be possible to decode an enhancement layer without decoding the base layer, because the enhancement layer may depend on the base layer.

Take the previous example in which the list of output layer sets would include five elements: one identifying layer 0 as the only output layer, one identifying layer 1 as the only output layer, one identifying layer 2 as the only output layer, one identifying layer 0 and layer 1 as the output layers, and another identifying layer 0 and layer 2 as the output layers. Suppose that in order to decode layer 1 or layer 2, layer 0 must be decoded. In this example, the output layer set includes five elements: one identifying layer 0 as the only output layer, and including an index to a corresponding layer set identifying layer 0 as the only layer to be decoded; one identifying layer 1 as the only output layer, and including an index to a corresponding layer set identifying layer 0 and layer 1 as the layers to be decoded; one identifying layer 2 as the only output layer, and including an index to a corresponding layer set identifying layer 0 and layer 2 as the layers to be decoded; one identifying layer 0 and layer 1 as the output layers, and including an index to a corresponding layer set identifying layer 0 and layer 1 as the layer to be decoded; and another identifying layer 0 and layer 2 as the output layers, and including an index to a corresponding layer set identifying layer 0 and layer 2 as the layers to be decoded.

The source device sends the bitstream to the client device, and the media application of the client device may extract a sub-bitstream from the bitstream based on the bitstream, the list of output layer sets, and the index to the target output layer set of the list of output layer sets. For the sub-bitstream extraction, it is relevant which layers are to be decoded, not which layers are to be output, but as discussed, the index to the list of output layer sets and the list of output layer sets is also used to derive the layers to be decoded. The layers to be decoded are relevant to the sub-bitstream extraction process. The extracted sub-bitstream, the list of output layer sets, the highest temporalID, and the index to the target output layer set of the list of output layer sets are sent to the decoder to decode the extracted sub-bitstream.

In these examples, the decoder essentially needs the following information: the extracted sub-bitstream, which layers should be decoded, which frame rates should be decoded, and which layers should be output. In some examples, the source device accordingly sends to the decoder the bitstream, the list of output layer sets, the highest TemporalID (which indicates what frames rates should be decoded), and the index to the output layer set (which, in conjunction with the list of output layer set, indicates which output layers should be output, and through the corresponding layer set to the output layer set, which the list also contains an index to, indicates which layers should be decoded). In some examples, the list of output layers is included in the VPS of the bitstream itself, while the index to the output layer set and the highest temporalID are sent to the decoder in some other manner, such as through the transport layer, as discussed above.

In some examples, the source device sends, in the VPS of the bitstream and/or through the transport layer or some other means, one or more syntax elements for the selected output operation point. The one or more syntax elements may include one or more identifiers for target output views, one or more identifiers for dependent views, and a lowest applicable highest temporalID.

FIG. 9 is a flow diagram illustrating an example process (995) of decoding video data. In some examples, the process of FIG. 9 may be performed, for example, by video decoder 30 of FIG. 5. After a start block, the process proceeds to block 996, where an index to at least one target output layer set in a list of output layer sets is received. The process then moves to block 997, where target output layers in the at least one target output layer set are determined based on the index. The process then advances to block 998, where at least the target output layers are decoded. The process then proceeds to block 999, where the decoded target output layers are output without outputting layers that are not targeted for output. The process then moves to a return block, where other processing is to be resumed.

As discussed above, in some examples, the video decoder receives, from the source device and/or the media application: the extracted sub-bitstream, the list of output layer sets, the highest TemporalID (which indicates what frames rates should be decoded), and the index to the output layer set (which, in conjunction with the list of output layer set, indicates which output layers should be output, and through the corresponding layer set to the output layer set, which the list also contains an index to, indicates which layers should be decoded).

The index to the target output set of the list of output layer sets may be used to generate one or more layer identifier lists for the bitstream extraction process. The index to the target output layer set of the list of output layers sets can also be used to identify the corresponding layer set for the target output layer set, where the corresponding layer set identities the set of layers that are to be decoded. The target output layer set itself may be used to identify which of the decoded layers should be output. The highest temporalID may be used to determine the frame rate to decode. Any layers that are decoded but not included in the set of layers targeted to be output are not output but are instead discarded. The layers in the set of layers to be output are output without outputting the layers that are not targeted for output.

In some examples, each output operation point is identified by the a list of nuh_layer_id values of all the pictures that are to be output, in increasing order of nuh_layer_id values, denoted as OptLayerIdList, and a variable OpTid, which is equal to the highest temporalID of all NAL units included in the output operation point. In some examples, the layer identifier list associated with the list OptLayerIdList, denoted as OpLayerIdList, consists of the list of nuh_layer_id values of all NAL units included in the output operation point, in increasing order of nuh_layer_id values. In some examples, the bitstream subset associated with the output operation point identified by OpLayerIdList and OpTid is the output of the sub-bitstream extraction process with the bitstream, the target highest temporalID equal to OpTid, and the target layer identifier list equal to OpLayerIdList as inputs. The OpLayerIdList and OpTid that identify an output operation point may also be referred to as the OpLayerIdList and OpTid associated with the output operation point, respectively.

A general decoding process that media application 124 and video decoder 30 may employ according to some examples is provided as follows. The input to this process is a bitstream. The output of this process is a list of decoded pictures.

In some examples, the variable OutputLayerSetIdx may be derived by media application 124. In other examples, the variable OutputLayerSetIdx may be derived by video decoder 30. The variable OutputLayerSetIdx, which specifies the index to the list of the output layer sets specified by the VPS, of the target output layer set, is specified as follows:

If some external means, not specified in this Specification, is available to set OutputLayerSetIdx, OutputLayerSetIdx is set by the external means.

Otherwise, if the decoding process is invoked in a bitstream conformance test as specified in subclause C.1, OutputLayerSetIdx is set as specified in subclause C.1.

Otherwise, OutputLayerSetIdx is set equal to 0.

"Subclause C.1" refers to subclause C.1 of HEVC WD10, and the contents of "subclause C.1" are also discussed below. In some examples, the decoder not only performs the decoding process, but also tests whether the bitstream is conforming. Subclause C.1 discusses how to test whether the bitstream is conforming or not. And the conformance testing of subclause C.1 includes determining whether all of the possible output layer sets satisfy all of the constraints. As discussed in greater detail in subclause C.1 and below, for conformance testing in accordance with subclause C.1, each output layer set is successively tested to determine whether or not the bitstream is decodable.

In some examples, the layer identifier list TargetOptLayerIdList, which specifies the list of nuh_layer_id values, in increasing order of nuh_layer_id values, of the pictures to be output, and the layer identifier list TargetDecLayerIdList, which specifies the list of nuh_layer_id values, in increasing order of nuh_layer_id values, of the NAL units to be decoded, are specified as follows:

```
lsIdx = output_layer_set_idx_minus1[ OutputLayerSetIdx ] + 1
for( k = 0, j = 0; j < NumLayersInIdList[ lsIdx ];j++) {
    TargetDecLayerIdList[ j ] = LayerSetLayerIdList[ lsIdx ][ j ]
        (8-1)
    if( output_layer_flag[ lsIdx ][ j ] )
        TargetOptLayerIdList[ k++ ] = LayerSetLayerIdList[ lsIdx ][ j ]
}
```

In some examples, this algorithm is used to determine the layers to be decoded and the layers to be output, by using the layer identifier list that includes nuh_layer_id values of the to be output (this list is named TargetOptLayerIdList) and the layer identifier list that includes the nuh_layer_id values to be decoded (this list is named TargetDecLayerIdList) by successively going through each of the possible nuh_layer_id values. In this way, this algorithm translates the index to the target output layer set of the list of output layer sets into something that the bitstream can use. This algorithm may be performed by media application 124 in some examples, and by video decoder 30 in other examples.

In some examples, the variable HighestTid, which identifies the highest temporal sub-layer to be decoded, is specified as follows:

If some external means, not specified in this Specification, is available to set HighestTid, HighestTid is set by the external means.

Otherwise, if the decoding process is invoked in a bitstream conformance test as specified in subclause C.1, HighestTid is set as specified in subclause C.1.

Otherwise, HighestTid is set equal to sps_max_sub_layers_minus1.

In some examples, the sub-bitstream extraction process is applied with the bitstream, HighestTid, and TargetDecLayerIdList as inputs, and the output is assigned to a bitstream referred to as BitstreamToDecode. In some examples, the sub-bitstream extraction process is performed by media application 124 of FIG. 7, which receives the bitstream, HighestTid, and TargetDecLayerIdList as inputs, and outputs a sub-bitstream BitstreamToDecode, which is then sent to video decoder 30 to decode. In other examples, video decoder 30 itself performs the sub-bitstream extraction. In other examples, the source device 10 performs the sub-bitstream extraction and sends destination device 14 the extracted sub-bitstream. In other examples, some other component, such as an upstream Media Aware Network Element (MANE) may perform the sub-bitstream extraction.

Video decoder 30 of FIG. 5 performs the video decoding, decoding the input extracted sub-bitstream BitstreamToDecode to output decoded pictures, as discussed in greater detail below.

In some examples, the decoding process is specified such that all decoders will produce numerically identical cropped decoded pictures. In these examples, any decoding process that produces identical cropped decoded pictures to those produced by the process described herein (with the correct output order or output timing, as specified) conforms to the decoding process requirements of this disclosure.

In some examples, a flag PicOutputFlag indicates whether the current picture (CurrPic) in BitStreamToDecode is output or not. An example PicOutputFlag may be used as follows. PicOutputFlag is 1 if the current picture is to be output and 0 if the current picture is not to be output. For example, if a picture is part of a layer that is not to be output, PicOutputFlag is set to 0. For the current picture CurrPic during the decoding process, PicOutputFlag is set as follows:

If the current picture is a RASL picture and NoRaslOutputFlag of the associated IRAP picture is equal to 1, PicOutputFlag is set equal to 0.

Otherwise if nuh_layer_id is not present in TargetOptLayerIdList, and the alternate output process is not enabled for this output layer set, PicOutputFlag is set equal to 0.

Otherwise if nuh_layer_id is not present in TargetOptLayerIdList, and the alternate output process is enabled for this output layer set, PicOutputFlag is set equal to 1 if the nuh_layer_id is externally provided, and set to 0 if the nuh_layer_id is not externally provided.

Otherwise, PicOutputFlag is set equal to pic_output_flag.

For a hypothetical reference decoder (HRD), two types of HRD parameter sets (NAL HRD parameters and VCL HRD parameters) may be used. In some examples, the HRD parameter sets are signalled through the hrd_parameters( ) syntax structure, which may be part of the SPS syntax structure or the VPS syntax structure.

Table 3 provides an example video parameter set extension syntax. In the video parameter set extension syntax according to this example, the variable numOutputLayerSets is changed to a global variable that may be used elsewhere in the disclosure.

TABLE 3

Video Parameter Set (VPS) extension syntax

| | Descriptor |
|---|---|
| vps_extension( ) { | |
| ... | |
|   NumOutputLayerSets = vps_number_layer_sets_minus1 + 1 | |
|   more_output_layer_sets_than_default_flag | u(1) |
|   if( more_output_layer_sets_than_default_flag ) { | |
|     num_add_output_layer_sets_minus1 | u(10) |
|     NumOutputLayerSets += num_add_output_layer_sets_minus1 + 1 | |
|   } | |
|   if(NumOutputLayerSets > 1 ) | |
|     default_one_target_output_layer_flag | u(1) |
|   for( i = 1; i < nNumOutputLayerSets; i++ ) { | |
|     if( i > vps_number_layer_sets_minus1 ) { | |
|       output_layer_set_idx_minus1[ i ] | u(v) |
|       lsIdx = output_layer_set_idx_minus1[ i ] + 1 | |
|       for( j = 0 ; j < NumLayersInIdList[ lsIdx ] − 1; j++) | |
|         output_layer_flag[ i ][ j ] | u(1) |
|     } | |
|     profile_level_tier_idx[ i ] | u(v) |
|   } | |
| ... | |
| } | |

As previously discussed, the index may be used not only to define a set of target output layers used during the decoding process, but also to determine the size of the DPB buffer. As the video decoder decodes one picture at a time, it may store them in the DPB. Depending on both which layers are being decoded and on which layers are being output, the optimal size of the DPB may change. Accordingly, the DPB size may be chosen by the video decoder based on the index to the target output layer set in the list of output layers sets.

As discussed above, in some examples, the decoder not only performs the decoding process, but also tests whether the bitstream is conforming, as follows. The conformance testing includes determining whether all of the possible output layer sets satisfy all of the constraints. Each output layer set is successively tested to determine whether or not the bitstream is decodable. This process according to these examples is explained in greater detail below.

Multiple tests may be needed for checking the conformance of a bitstream, which is referred to as the bitstream under test. For each test, the following steps apply in the order listed:

1. A target output layer set, identified by OutputLayerSetIdx, and a target highest temporalID value, HighestTid, are selected. The value of OutputLayerSetIdx shall be in the range of 0 to NumOutputLayerSets-1, inclusive. The value of HighestTid shall be in the range of 0 to vps_max_sub_layers_minus1, inclusive. TargetOptLayerIdList and TargetDecLayerIdList are then derived as specified in Equation 8-1. The operation point under test has OptLayerIdList equal to TargetOptLayerIdList, OpLayerIdList equal to TargetDecLayerIdList, and OpTid equal to HighestTid.

2. The sub-bitstream extraction process invoked with the bitstream under test, HighestTid, and TargetDecLayerIdList as inputs, and the output is assigned to BitstreamToDecode.

3. The hrd_parameters( ) syntax structure and the sub_layer_hrd_parameters( ) syntax structure applicable to TargetOp are selected. If TargetDecLayerIdList contains all nuh_layer_id values present in the bitstream under test, the hrd_parameters( ) syntax structure in the active SPS (or provided through an external means not specified in this Specification) is selected. Otherwise, the hrd_parameters( ) syntax structure in the active VPS (or provided through some external means not specified in this Specification) that applies to TargetOp is selected. Within the selected hrd_parameters( ) syntax structure, if BitstreamToDecode is a Type I bitstream, the sub_layer_hrd_parameters(HighestTid) syntax structure that immediately follows the condition "if(vcl_hrd_parameters_present_flag)" is selected and the variable NalHrdModeFlag is set equal to 0; otherwise (BitstreamToDecode is a Type II bitstream), the sub_layer_hrd_parameters(HighestTid) syntax structure that immediately follows either the condition "if (vcl_hrd_parameters_present_flag)" (in this case the variable NalHrdModeFlag is set equal to 0) or the condition "if(nal_hrd_parameters_present_flag)" (in this case the variable NalHrdModeFlag is set equal to 1) is selected. When BitstreamToDecode is a Type II bitstream and NalHrdModeFlag is equal to 0, all non-VCL NAL units except filler data NAL units, and all leading_zero_8 bits, zero_byte, start_code_prefix_one_3 bytes, and trailing_zero_8 bits syntax elements that form a byte stream from the NAL unit stream (as specified in Annex B), when present, are discarded from BitstreamToDecode, and the remaining bitstream is assigned to BitstreamToDecode.

4. An access unit associated with a buffering period SEI message (present in BitstreamToDecode or available through external means not specified in this Specification) applicable to TargetOp is selected as the HRD initialization point and referred to as access unit 0.

5. For each access unit in BitstreamToDecode starting from access unit 0, the buffering period SEI message (present in BitstreamToDecode or available through external means not specified in this Specification) that is associated with the access unit and applies to TargetOp is selected, the picture timing SEI message (present in BitstreamToDecode or available through external means not specified in this Specification) that is associated with the access unit and applies to TargetOp is selected, and when SubPicHrdFlag is equal to 1 and sub_pic_cpb_params_in_pic_timing_sei_flag is equal to 0, the decoding unit information SEI messages (present in BitstreamToDecode or available through external means not specified in this Specification) that are associated with decoding units in the access unit and apply to TargetOp are selected.

6. A value of SchedSelIdx is selected. The selected SchedSelIdx shall be in the range of 0 to cpb_cnt_minus1[HighestTid], inclusive, where cpb_cnt_minus1[HighestTid] is found in the sub_layer_hrd_parameters (HighestTid) syntax structure as selected above.

7. When the coded picture in access unit 0 has nal_unit_type equal to CRA_NUT or BLA_W_LP, and irap_cpb_params_present_flag in the selected buffering period supplemental enhancement information (SEI) message is equal to 1, either of the following applies for selection of the initial CPB removal delay and delay offset:

If NalHrdModeFlag is equal to 1, the default initial CPB removal delay and delay offset represented by nal_initial_cpb_removal_delay[SchedSelIdx] and nal_initial_cpb_removal_offset[SchedSelIdx], respectively, in the selected buffering period SEI message are selected. Otherwise, the default initial CPB removal delay and delay offset represented by vcl_initial_cpb_removal_delay[SchedSelIdx] and vcl_initial_cpb_removal_offset[SchedSelIdx], respectively, in the selected buffering period SEI message are selected. The variable DefaultInitCpbParamsFlag is set equal to 1.

If NalHrdModeFlag is equal to 1, the alternative initial CPB removal delay and delay offset represented by nal_initial_alt_cpb_removal_delay[SchedSelIdx] and nal_initial_alt_cpb_removal_offset[SchedSelIdx], respectively, in the selected buffering period SEI message are selected. Otherwise, the alternative initial CPB removal delay and delay offset represented by vcl_initial_alt_cpb_removal_delay[SchedSelIdx] and vcl_initial_alt_cpb_removal_offset[SchedSelIdx], respectively, in the selected buffering period SEI message are selected. The variable DefaultInitCpbParamsFlag is set equal to 0, and the random access skipped leading (RASL) access units associated with access unit 0 are discarded from BitstreamToDecode and the remaining bitstream is assigned to BitstreamToDecode.

8. When sub_pic_hrd_params_present_flag in the selected hrd_parameters( ) syntax structure is equal to 1, the CPB is scheduled to operate either at the access unit level (in which case the variable SubPicHrdFlag is set equal to 0) or at the sub-picture level (in which case the variable SubPicHrdFlag is set equal to 1).

As described in this disclosure, a "video coder" may be used to generally refer to both a video encoding device and a video decoding device. In addition, "video coding" may refer to video encoding or video decoding.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium. Examples of this disclosure may include a non-transitory computer-readable storage medium having stored thereon instructions that, when executed, cause at least one processor to perform a process such as one or more of the processes described in this disclosure.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   receiving, by a video decoder, a list of output layer sets in a video bitstream;
   receiving, by the video decoder, external from the video bitstream, an index to a target output layer set in the list of output layer sets;
   determining, by the video decoder, target output layers in the target output layer set based on the index;
   decoding, by the video decoder, at least the target output layers from the video bitstream;
   outputting, by the video decoder, the decoded target output layers without outputting layers that are not targeted for output; and
   selecting, by the video decoder, a decoded picture buffer (DPB) size or sub-DPB size based at least partially on the index.

2. The method of claim 1, wherein the target output layer set includes a set of nuh_layer_id values, and wherein decoding at least the target output layers includes decoding data for pictures corresponding to the nuh_layer_id values in the target output layer set.

3. The method of claim 1, wherein each of the layers corresponds to at least one of a view, an image resolution, or a quality representation.

4. The method of claim 1, wherein decoding at least the target output layers includes decoding the target output layers, and further includes, when at least one of the target output layers depends on a reference layer that is not included in the set of target output layers, decoding the reference layer.

5. The method of claim 1, further comprising:
   decoding at least the target output layers based on one or more syntax elements in a video picture sequence (VPS) of the video bitstream that signal an output operation point including the target output layers.

6. The method of claim 5, wherein the one or more syntax elements include the list of output layer sets.

7. The method of claim 1, wherein the list of output layer sets includes, in each output layer set in the list of output layer sets, another index to a layer set that corresponds to the output layer set, and wherein decoding at least the target output layers includes decoding each layer in the corresponding layer set.

8. The method of claim 7, wherein the corresponding layer set identifies each of the layers to be decoded, the target output layer set identifies each of the layers targeted for output, and wherein layers targeted for output are a subset of the layers to be decoded.

9. The method of claim 1, wherein receiving the index includes receiving the index in a transport layer.

10. The method of claim 9, wherein the index to the target output layer set in the list of output layer sets is associated with a specific output operation point selected from a set of output operation points associated with a manifest file that includes information on the target output layer set.

11. The method of claim 10, wherein the manifest file includes a media presentation description (MPD).

12. The method of claim 10, wherein the manifest file includes a session description protocol (SDP) message.

13. The method of claim 10, wherein the manifest file is associated with a transport protocol comprising one of dynamic adaptive streaming over Hypertext Transfer Protocol (HTTP) (DASH), real-time transport protocol (RTP), or real time streaming protocol (RTSP).

14. A device for decoding video data, comprising:
   a memory configured to store data; and
   one or more processors in communication with the memory and configured to:
      receive a list of output layer sets in a video bitstream;
      receive, external from the video bitstream, an index to a target output layer set in the list of output layer sets;
      determine target output layers in the target output layer set based on the index;
      decode at least the target output layers;
      output the decoded target output layers without outputting layers that are not targeted for output; and select a decoded picture buffer (DPB) size or sub-DPB size to be included in the memory based at least partially on the index.

15. The device of claim 14, wherein the device comprises at least one of:
an integrated circuit;
a microprocessor; or
a wireless communication device.

16. The device of claim 14, wherein the target output layer set includes a set of nuh_layer_id values, and wherein decoding at least the target output layers includes decoding data for pictures corresponding to the nuh_layer_id values in the target output layer set.

17. The device of claim 14, wherein each of the layers corresponds to at least one of a view or an image resolution.

18. The device of claim 14, wherein decoding at least the target output layers includes decoding the target output layers, and further includes, when at least one of the target output layers depends on a reference layer that is not included in the set of target output layers, decoding the reference layer.

19. The device of claim 14, wherein the one or more processors are further configured to:
extract an output operation point based one or more syntax elements in a video picture sequence (VPS) of the bitstream that signal the output operation point.

20. The device of claim 19, wherein the one or more syntax elements include the list of output layer sets.

21. The device of claim 19, wherein the list of output layer sets includes, in each output layer set in the list of output layer sets, another index to a layer set that corresponds to the output layer set, and wherein decoding at least the target output layers includes decoding each layer in the corresponding layer set.

22. The device of claim 21, wherein the corresponding layer set identifies each of the layers to be decoded, the target output layer set identifies each of the layers targeted for output, and wherein layers targeted for output are a subset of the layers to be decoded.

23. A non-transitory computer-readable storage medium having stored thereon instructions that, when executed, cause at least one processor to:
receive a list of output layer sets in a video bitstream;
receive, external from the video bitstream, an index to a target output layer set in the list of output layer sets;
determine target output layers in the target output layer set based on the index;
decode at least the target output layers from the video bitstream; and
output the decoded target output layers without outputting layers that are not targeted for output; and
select a decoded picture buffer (DPB) size or sub-DPB size based at least partially on the index.

24. A device for decoding video data, the device comprising:
means for receiving a list of output layer sets in a video bitstream;
means for receiving, external from the video bitstream, an index to a target output layer set in the list of output layer sets;
means for determining target output layers in the target output layer set based on the index;
means for decoding at least the target output layers from the video bitstream;
means for outputting the decoded target output layers without outputting layers that are not targeted for output; and
means for selecting a decoded picture buffer (DPB) size or sub-DPB size based at least partially on the index.

* * * * *